(12) United States Patent
Martin, Jr. et al.

(10) Patent No.: US 8,825,618 B2
(45) Date of Patent: Sep. 2, 2014

(54) METHODS AND SYSTEMS FOR ENHANCED DATA UNIFICATION, ACCESS AND ANALYSIS

(76) Inventors: Russell W. Martin, Jr., New York, NY (US); Stephen D. Messer, New York, NY (US)

( * ) Notice: Subject to any disclaimer, the term of this patent is extended or adjusted under 35 U.S.C. 154(b) by 0 days.

(21) Appl. No.: 13/117,569

(22) Filed: May 27, 2011

(65) Prior Publication Data

US 2012/0303644 A1 Nov. 29, 2012

(51) Int. Cl.
*G06F 17/30* (2006.01)

(52) U.S. Cl.
USPC .......................................... 707/705; 707/756

(58) Field of Classification Search
USPC ................................. 707/705, 756
See application file for complete search history.

(56) References Cited

U.S. PATENT DOCUMENTS

| | | | |
|---|---|---|---|
| 2005/0086211 A1* | 4/2005 | Mayer | 707/3 |
| 2008/0086345 A1* | 4/2008 | Wilson et al. | 705/7 |
| 2008/0235241 A1* | 9/2008 | Hattori et al. | 707/10 |
| 2010/0083057 A1* | 4/2010 | Laxminarayanan | 714/48 |
| 2010/0088155 A1* | 4/2010 | Pyle et al. | 705/10 |
| 2010/0313009 A1* | 12/2010 | Combet et al. | 713/150 |
| 2011/0040846 A1* | 2/2011 | Weinryb et al. | 709/206 |
| 2011/0126128 A1* | 5/2011 | McKenzie et al. | 715/753 |
| 2012/0084117 A1* | 4/2012 | Tavares et al. | 705/7.29 |

OTHER PUBLICATIONS

International Search Report for PCT/US12/37261.

* cited by examiner

*Primary Examiner* — Kim Nguyen
(74) *Attorney, Agent, or Firm* — James M. Bollinger, Esq.; Scott D. Barnett, Esq.; Troutman Sanders LLP

(57) ABSTRACT

A computer based system manages the collection, analysis and presentation of data. The system in one arrangement includes an online platform for collecting and unifying data across multiple channels. The platform also provides a vehicle for a plurality of users/groups to collectively analyze the data. The present system in one illustrative embodiment thus provides a data clearinghouse for gathering information from a plurality of channels, facilitating the sharing of this information, and facilitating the cooperative analysis of this information.

16 Claims, 32 Drawing Sheets

Collective Intelligence
Start to use

Sign-In

Corporate E-mail:

Password:

[Sign-In]

Or, sign-in with the one of the following services:

[Facebook] [Google]
[twitter] [PayPal]
[YAHOO!] [OpenID]

Register New Account

Your Corporate E-mail:

Confirm E-mail:

Password:

Confirm Password:

Presentation Code (optional):

overlooks inquiry reCAPTCHA
stop spam.
read books.

Type the two words:

☐ I would like periodic updates from Collective intelligence

☐ Yes, I agree to the Collective Intelligence Terms of Service

[Register]

Collective Intelligence

Welcome, Toby.
Last logged In: 11/06/2010, 10:15pm EST
US English

| Home | Analysis | Sharing | Learn | Develop | Presentations | Messages | Account | edit

Trending Analysis: Website Traffic   Choose Trending Analysis ▼                                   edit settings (pie chart) — New activity on report (bar chart)

Friend Requests                                                                                                    edit settings

- Toby Flenderson from AA Advertising — accept ignore add to group
- Janet Levenson from On Target Data — accept ignore add to group
- Creed Bratton from American Autogiro — accept ignore add to group

Group Activity                                                                                                      edit settings Josh L. replied to Jennifer R.'s comment on the presentation, Q4 Cross-Media Campaign for New Accounts. 1 hour ago  Comment Like Hide Edit Delete Yusef M. added data, Point of Sales for Flagship Stores. 3 hours ago Comment Like Hide Jim H. annotated the report, Creative Effectiveness. 3 hours ago Comment Like Hide "lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat."

Jim Halpert, SVP Consumer Marketing, Paper Plus
secteur adipisicing elit, sed do eiumod tempor agna aliqua. Ut enim ad minim veniam"
View Profile
673 Send Message   ...ore activity A reputation score or points

---

| Headlines | Tweets | Comments on Blogs |

Go-Go Bicycles Leads Efforts in Cross-Channel Marketing  7 hours ago
lorem ipsum dolor sit amet, consectetur adipisicing elit, sed do eiusmod tempor incididunt ut labore et dolore magna aliqua. Ut enim ad minim veniam, quis nostrud exercitation ullamco
Share Hide Like

Interview with 'The Data Guy,' Toby Flenderson  3 days ago
lorem ipsum dolor sit amet, consectetur adipisicing elit, sed do eiusmod tempor incididunt ut labore et dolore magna aliqua. Ut enim ad minim veniam, quis nostrud exercitation ullamco
Share Hide Like

Affinity Bicycles on a Mission to Win Back Customers  4 days ago
lorem ipsum dolor sit amet, consectetur adipisicing elit, sed do eiusmod tempor incididunt ut labore et dolore magna aliqua. Ut enim ad minim veniam, quis nostrud exercitation ullamco
Share Hide Like

Bike-share Programs Are Shifting Into High Gear  1 week ago
lorem ipsum dolor sit amet, consectetur adipisicing elit, sed do eiusmod tempor incididunt ut labore et dolore magna aliqua. Ut enim ad minim veniam, quis nostrud exercitation ullamco
Share Hide Like

Schedule of Events                                                                                         edit settings

| Industry | Company |

| Event Add event | Media Channel | Start Date | Owner |
|---|---|---|---|
| Rewards for Repeat Purchases | Online Display | 06/04/2010 | Meredith P. |
| Northeast Pilot for New Accounts | Radio | 12/01/2010 | Pam B. |
| Northeast Pilot for New Accounts | Television | 12/01/2010 | Andy B. |
| Kevin M. is speaking at Long Tail Webinar | | | Kevin M. |

Add to My Calendar
Send E-mail Reminder
Share
Hide

Announcements                                                                                                   edit settings

labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt
reply – hide

 Dwight S. 15 hours ago
lorem ipsum dolor sit amet, consectetur adipisicing elit, sed do eiusmod tempor incididunt ut labore et dolore magna aliqua. Ut enim ad minim veniam, quis nostrud exercitation ullamco
reply – hide

 Toby F. 12 hours ago
lorem ipsum dolor sit amet, consectetur adipisicing elit, sed do eiusmod tempor incididunt ut labore et dolore magna aliqua. Ut enim ad minim veniam, quis nostrud exercitation ullamco
reply – hide Janet L. attached a report, 3 Key Integrations for Interactive Marketing Success 18 hours ago
reply – hide

Collective Intelligence

| Home | Analysis | Sharing | Learn | Develop | Presentations |

Welcome, Toby.
Last logged In: 11/06/2010, 10:15pm EST
US English | Messages | Account Add Friends \ Friend/Group Requests \ Groups \ History

Friend Requests

Kevin Malone
Director, Quantitative Analysis
Delaney Bank
Accept Ignore Add to group

Janet Levenson
SVP, Consumer Marketing
American Autogiro
Accept Ignore Add to group

Creed Bratton
Director, Customer Experience
Go-Go Bicycles
Accept Ignore Add to group

Group Invitations

Q4 Campaign Measurement Working Group 🔒
Owner – Kevin Malone, Director, Quantitative Analysis at Delaney Bank | 11 members lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat.

Accept Ignore

Collective Intelligence

Welcome, Toby.
Last logged In: 11/06/2010, 10:15pm EST

[US English ▼]

| edit | Home | Analysis | Sharing | Learn | Develop | Presentations | Messages | Account |

\\ Add Friends \\ Friend/Group Requests \\ Groups \\ History \\

Create New Group Back to Groups

Name: * [_____]

Members: [Enter names of existing CI members]

> Might not need to define industry of group. We can deduce from the industry of the members Logo: [_____] [Browse]

Group Type: * [Select type.]

Summary: * [Enter a brief description about your group and its purpose. Your summary about this group will appear in the Groups Directory.]
200 characters left.

Description: * [Your full description of this group will appear on your group pages.]
200 characters left.

My Email: * [_____]

Access:
○ Open Access
○ Same Company Only
⊙ Request to Join

Pre-approve members from the following email domains:
[Enter domains separated by a space, comma, or new line.]

Language: [English ▼]

☐ Check to confirm you have read and accept the Terms of Service.

[Create Group]

Attachments & Links

- 3 Key Integrations for Interactive Marketing Success
- Turning Call Centers into Revenue Streams

Related Reports

- Calls by Time of Day
- Product Shipments by Day
- Call Types

Use accordion to expand/collapse modules

Dwight 15 hours
lorem ipsum dolor sit amet, consectetur adipisicing elit, sed do eiusmod tempor incididunt ut labore et dolore magna aliqua. Ut enim ad minim

Toby 12 hours
lorem ipsum dolor sit amet, consectetur adipisicing elit, sed do eiusmod tempor incididunt ut labore et dolore magna aliqua. Ut enim ad minim Reply | Send message | Attach Post a reply....

☑ Save chart                    Post

Janet L. attached a report, 3 Key Integrations for Interactive   18
Reply | Send message | Attach | Show all

*really interesting data"*
Tyler Philpot commented on Daily Sales
*"Something about this chart doesn't make sense if you look at...* See more
Jonas Fisher presented "Sales Pitch to Apple" on Awesome Numbers

Report Activity

Marcus Louie commented on Calls Per Day:
*"I think this shows some really interesting data"*
Tyler Philpot commented on Daily Sales
*"Something about this chart doesn't make sense if you look at...* See more
Jonas Fisher presented "Sales Pitch to Apple" on Awesome Numbers

FIG. 23b

METHODS AND SYSTEMS FOR ENHANCED DATA UNIFICATION, ACCESS AND ANALYSIS

FIELD OF THE INVENTION

The present invention relates to computer systems and networks that permit digital communication among a large population of participants in a networked data unification system. The invention includes overlapping features and technologies found and disclosed in co-pending U.S. patent application Ser. No. 12/135,788 titled "Methods and Systems For Providing Advertisements" (the '788 application), and Ser. No. 12/902,019 titled "Methods and Systems for Enhanced Resource Allocation" (the '019 application), both to the applicant here and commonly assigned. The '788 and '019 applications are hereby incorporated by reference in full as if restated in their entirety.

BACKGROUND OF THE INVENTION

Network communication systems such as the Internet offer a powerful data unification platform. Data unification and collaborative analysis of data may be facilitated by selectively configuring the platform available to users during online sessions on the worldwide web ("web"). As the number of types and sources of data has grown greatly, the complexity and difficulty in the organization and analysis of data between relevant participants on the internet has also grown.

Data is generated and collected by a plurality of segregated or "siloed" groups. Siloed groups tend to not share information or share incomplete information. Even when siloed groups do share information, it is often not shared in an optimal or compatible format, and/or not analyzed in a collaborative manner.

In the commerce context, for example, there exists a paradigm in the marketing/advertisement industry of viewing advertisement channels as separate and distinct. As an illustration, a marketing group may segment a promotional campaign by advertisement channels, such as online advertisements, newspaper advertisements, radio advertisements, etc. As another example, a corporation may segment its departments between sales, advertising marketing, distribution, production and research. These siloed groups, if not managed correctly, result in misallocation of scarce resources (as discussed in the '019 application), ineffective or inefficient use of data collection, and suboptimal or inefficient data analysis. Stated differently, this silo paradigm leads to "losing the forest for the trees" since groups fail to realize the efficiency and effectiveness obtained from consolidation of data and collaboration of analysis across multiple groups and channels. Prior attempts to remedy these deficiencies, before the present invention, have been unsatisfactory.

OBJECTS AND SUMMARY OF THE PRESENT INVENTION

Illustrative embodiments of the present invention preferably include an online platform for creating a unified data model across multiple channels. An exemplary online platform allows a user to gather and analyze data from multiple channels and to view and create reports based on these analyses. These reports can be realized through collaborative analysis efforts, between multiple users and organizations. An example of data from multiple channels may be the marketing and sales data from an organization's online sector and offline sector. A web portal or similar interface is provided for collecting and consolidating this data, and providing a vehicle for a plurality of users/groups to collectively analyze the data. In a preferred embodiment, the data collection, analysis, and/or collaboration can occur in real-time or near real-time. This web portal or online platform can be accessed through a personal computer, laptop, cell phone, tablet computer, etc.

One aspect of the present invention provides a network based system that supports digitally tracking of multiple promotional vehicles, including both off-line and on-line advertising in a comprehensive manner. Because the illustrative computer systems of the present invention track different types of media channels, these systems further allow for the de-segregating of marketing campaigns by media channel, and for the tracking and optimization of segments of and/or the entire marketing campaigns by implementing a protocol of common measurements across different media channels.

In another aspect, the present invention includes resources for consolidating a plurality of different data sets, for example data sets involving plural promotional campaigns, by creating a unified data model. This unified data model allows for users to compare and analyze data sets together and against each other, which would not otherwise be compatible or convenient for such analysis. Furthermore, the present system allows for a plurality of users or groups to share data sets, access data sets, and perform collaborative analysis of data sets. The present system in one illustrative embodiment thus provides a data clearinghouse for gathering information from a plurality of channels, facilitating the sharing of this information, and facilitating the cooperative analysis of this information.

The foregoing and other features of the present invention are further presented in conjunction with the following diagrams depicting specific illustrative embodiments of the present invention of which:

BRIEF DESCRIPTION OF THE FIGURES

FIGS. 1-24 are screen shots of illustrative embodiments of the present invention.

DESCRIPTION OF THE INVENTION AND ILLUSTRATIVE EMBODIMENTS THEREOF

Figure 4:
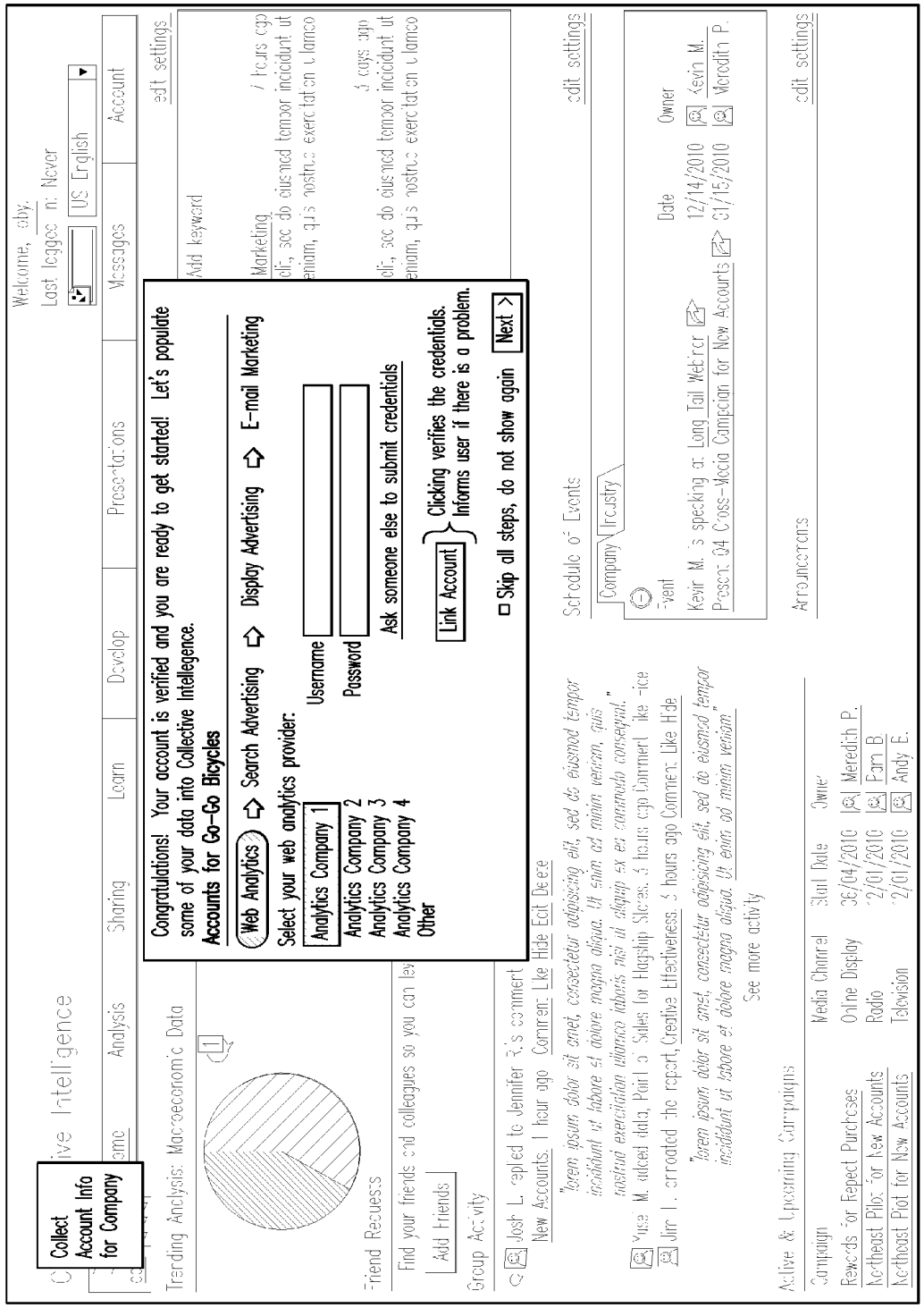

To illustrate the present invention, the following specific embodiments are disclosed using nomenclature and terminology having well understood meaning specific to the industry specializing in online data collection/analysis platforms.

The present invention, in one arrangement, resides in a selectively programmed computer system known as the "Collective Intelligence System," that operates on a publicly accessible network. For purposes of this disclosure, the operative computer system will be referred to as the "CIS." A useful application of the CIS extends to the processing of marketing specific data. Specifically, the CIS includes program controlled data processing that allows users to access and interact with data from different channels, in a data format independent environment. Using software implemented tools, the system allows users to create comprehensive reports and analyze selected data sets and/or reports. In addition, users may use reports already available within CIS to analyze their data.

The terms "report" and "analysis" are used throughout the specification. The meaning of these terms in the context of the CIS system will now be described.

Reporting is the process of organizing data into informational summaries in order to monitor how different areas of a business are performing. Reporting translates raw data into information and helps users to monitor business and be alerted to when data falls outside of expected ranges. In the context of the CIS, "reports" are based on reporting and are essentially summaries of data sets. For example, a report could be directed to the top ten products that have sold, or the daily revenue generated by a product.

Analyzing is the process of exploring data and information in order to extract meaningful insights, which can be used to better understand and improve business performance. "Analyses" are based on analyzing and have been designed to answer one or more business questions; for example, whether an email marketing campaign has an effect on sales. An analysis can be made up of multiple reports. Additionally, an analysis may allow users to drill down on reports; for example, going from nationwide sales to state specific sales.

Although portions of the foregoing sections will be discussed with respect to marketing, it is understood by those skilled in the art that the following teachings can be equally applied to other areas where specialized, but articulated data is collected and/or analyzed. For example, different "channels" that would benefit from collaborating on data include: different sections within one of an organization's departments, different departments within an organization, different organizations, different individuals, and/or individuals and organizations/groups.

An organization may include a sales department and a marketing department which is divided into different groups, where such groups may have responsibilities regarding different marketing channels, such as mail, TV, and Internet (all collectively different channels). Within each of these channels, data are formatted differently and collected/stored independently. More importantly, different metrics to determine success are used in each channel. Accordingly, each group makes decisions based on siloed information, such as creating a budget for TV advertising utilizing only TV response data. Once the CIS is implemented, the TV advertising group may pull data from other sources, such as internet advertising or the sales department. The CIS can also recommend sources of data that may add the most value to the user, group, or report objectives.

The CIS is selectively configured to pull data from a variety of sources, such as LinkedIn for general information about a user, group or organization, or Google Analytics for detailed data including sales information. In a preferred embodiment, data within the CIS, such as Google Analytics sales information, is updated in real-time or near real-time. In one embodiment, CIS users may selectively choose which of their data sets, or which data sets used by their reports or analyses, should be updated in real-time or near real-time.

Another feature optionally provided by the CIS is benchmarking. Specifically, data may be obtained from related groups and then aggregated. Users can then see how their organization relates to related organizations. For example, an online widget seller can see how their profit margins compare to similar organizations. In one embodiment, the CIS facilitates the anonymous collection of data for benchmarking. Accordingly, organizations can see how they compare to their peers, without sensitive financial (or other) information being publicly available. The data may be aggregated to provide averages, lows, highs, modes, etc.

The system also facilitates relationship based links to other nodes such as individuals or organizations. Although social networking sites such as LinkedIn and Facebook are well known in the art, the CIS takes into consideration data collection and analytic goals and leverages data set information to facilitate "value added" driven connections. Furthermore, unlike prior art social networking, the CIS provides a powerful platform for collaborative analysis of data. The CIS also includes a "marketplace" for the distribution of data sets outside of an organization. These features are described in further detail below.

Data may also leave the CIS for decision support or other purposes. In one embodiment, programmatic access to data is given via an API. For example, a customer may use a third-party to help them choose which ads to run and how much to bid for advertising inventory in real-time. That third-party may in turn be allowed to access the customer's data via CIS's API. This is important for two reasons: 1) the third-party may now have real-time access to data that was not previously available to them, because the original source of the data only provided data on a daily basis, for example, and 2) the third-party now has access to data that CIS has combined or integrated. For example, CI may have combined and made available e-mail marketing and affiliate advertising data, which previously would have required someone to integrate themselves either manually or through an automated process.

Data could also be exported via CSV or other standard format for a user to manipulate outside of the CIS system. Additionally, sellers of data in the CIS marketplace could optionally allow purchasers to have access to the raw data and/or data that may be used outside of the CIS system.

Another feature of the CIS is the generation of "Collective Intelligence IQs" for users. This "IQ" is based on the previous work the user has done, as measured by the system. In one embodiment, a first user's IQ is represented by a single number. In another embodiment, the first user's IQ is further dependant on the identity of a second user in viewing the first user's IQ. For example, the first user is a widget marketing expert who has generated many highly rated widget marketing CIS reports. The first user's IQ may appear higher to a second user who is also in the widget marketing field, than to a third user who is in the donut marketing field. The CIS can make recommendations to users/organizations based on user IQs. In the CIS, analysis of data will be facilitated through "reports." In a preferred embodiment, one user "owns" the report (or is primarily responsible for it), and they and others can discuss, publish or share the report. On the report discussion page, users may comment on a certain data point, or overlay other data on top of existing data set(s). For example, overlaid data can allow a user to see merchandise return data on top of click through conversion rate data.

Another feature of the CIS is its developer kits. The CIS has core analysis tools, but allows users to develop additional tools for analysis, data collections, and visualization. These developers may also share or sell the tools they create with other users or organizations, in the CIS marketplace (discussed in further detail below). In addition, third parties may sell or share their data and/or services in the CIS marketplace.

Network-based operation is depicted via FIGS. 1-24, where navigation through an enhanced portal/interface permits controlled access and implementation of system operative features. Beginning with FIG. 1, when a user lands at the CIS website, they may sign in with their existing account, or create/register a new account if they do not have one. In one embodiment, the system requires an organization email address to register. In FIGS. 2a-b, the system collects information about the user's organization, and optionally imports some or all of this information via LinkedIn or similar. Organization information may include organization name, parent organization, description, website, industry, type (privately or publicly held), year founded, organization size, address, and the organization's email domain names.

Figure 3A:
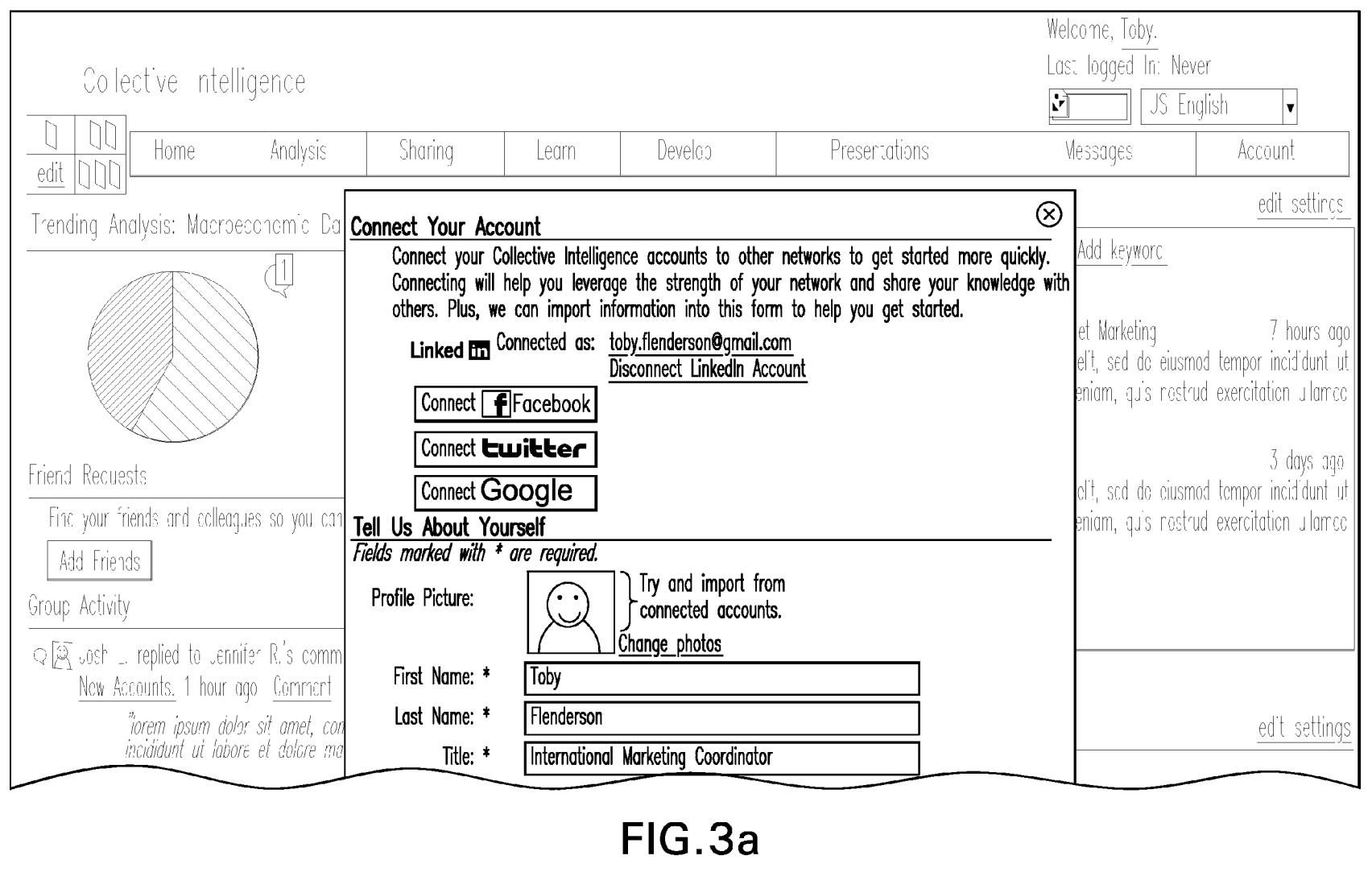
Figure 3B:
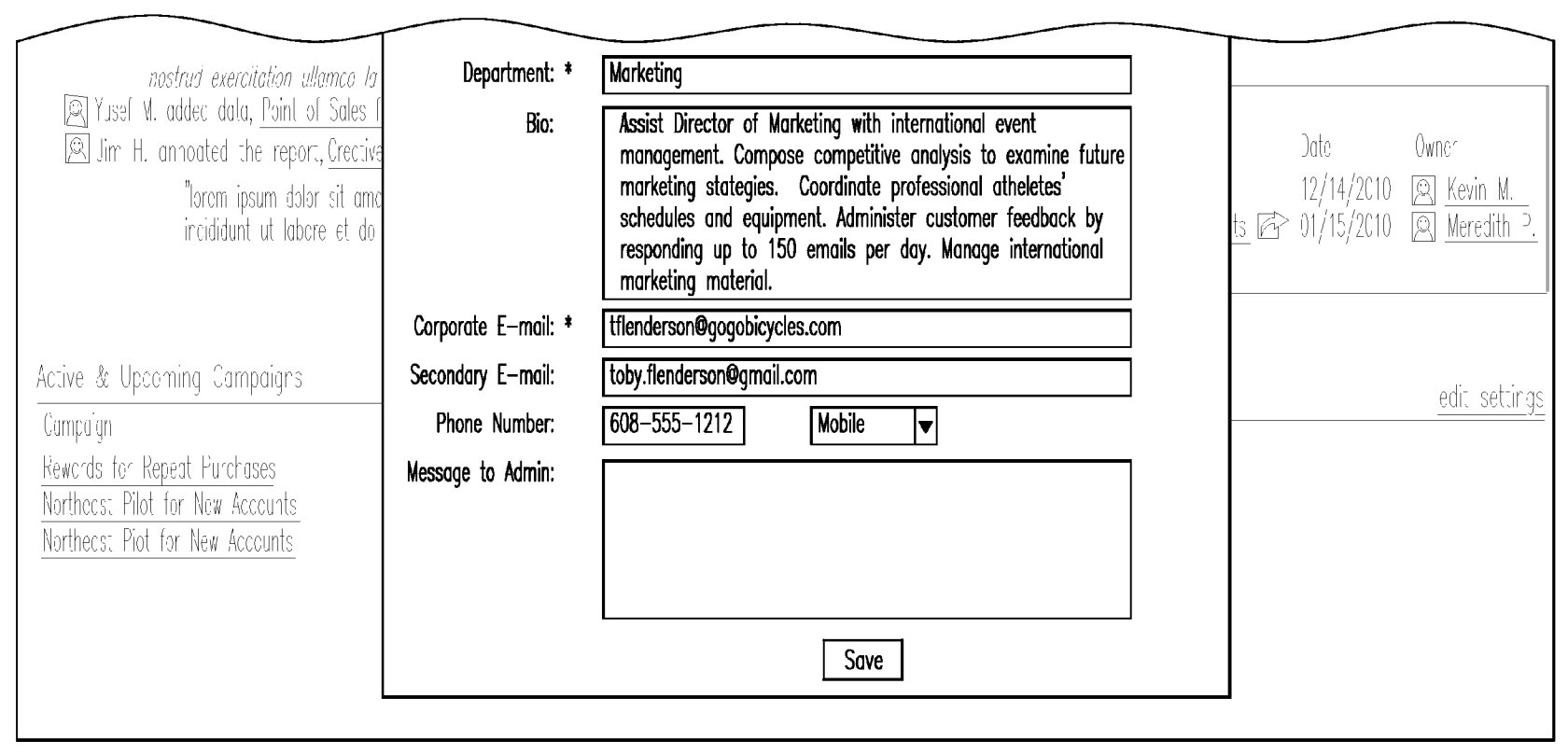
Figure 5:
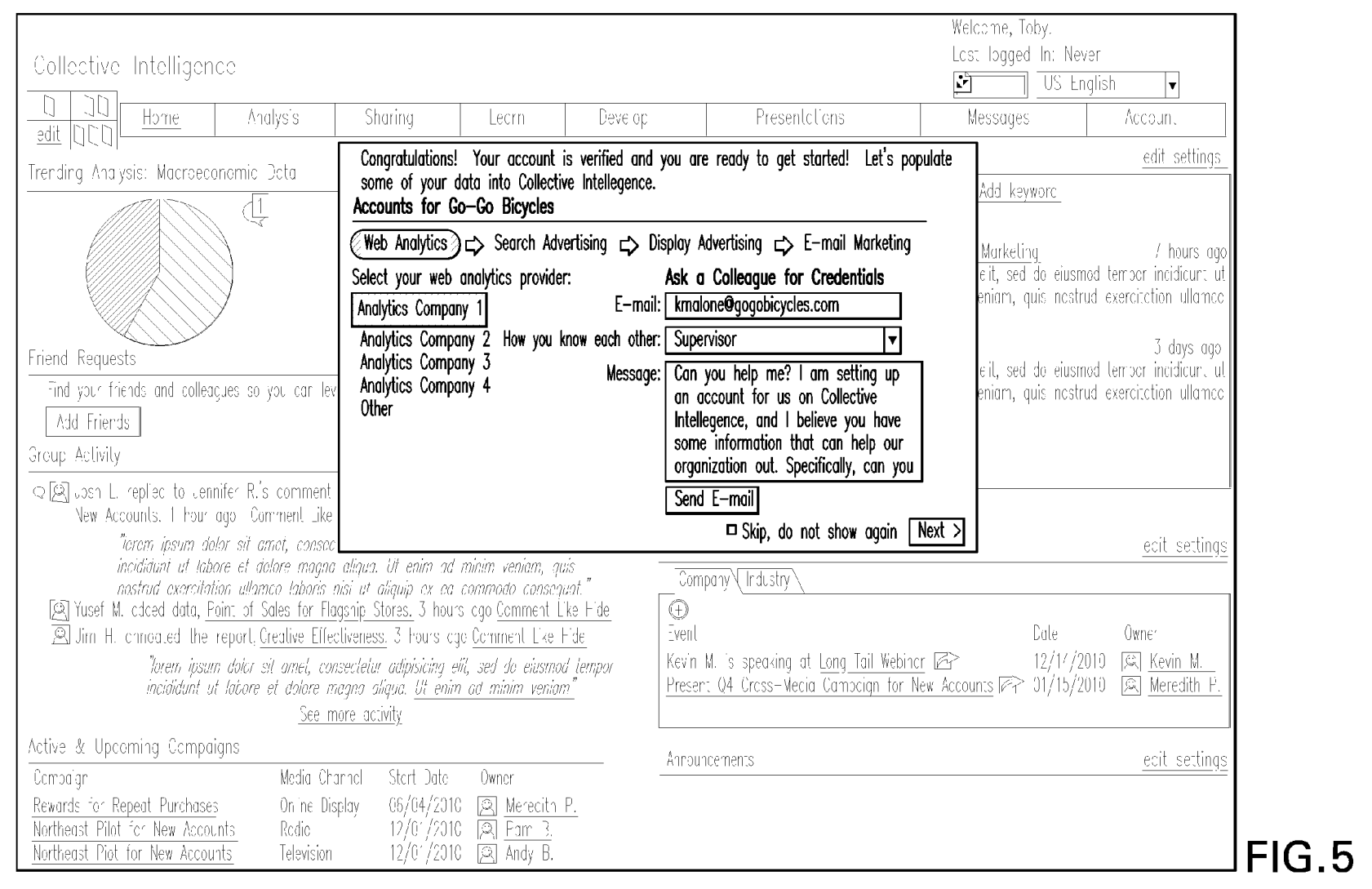

In FIGS. 3a-b, the system collects information about the user. Optionally, the user may import this information, as well as relationship/link information via Facebook, Twitter and Google (or similar). Information about the user includes name, title, department, biography, corporate email, secondary email, and phone number. The user may also write a message to the organization administrator during this sequence, for example, to request certain privileges or rights to access data sets. FIG. 4 shows the system requesting analytic information to import. This can be done by submitting the username and password for a web based analytics company, such as Google Analytics. If the desired analytic company is not listed, the user may manually enter the analytic company name and/or information. If the user does not have the credentials for their organization's analytic account, they may send a message to another party who would have access directly through the CIS, as shown in FIG. 5.

Figure 6:
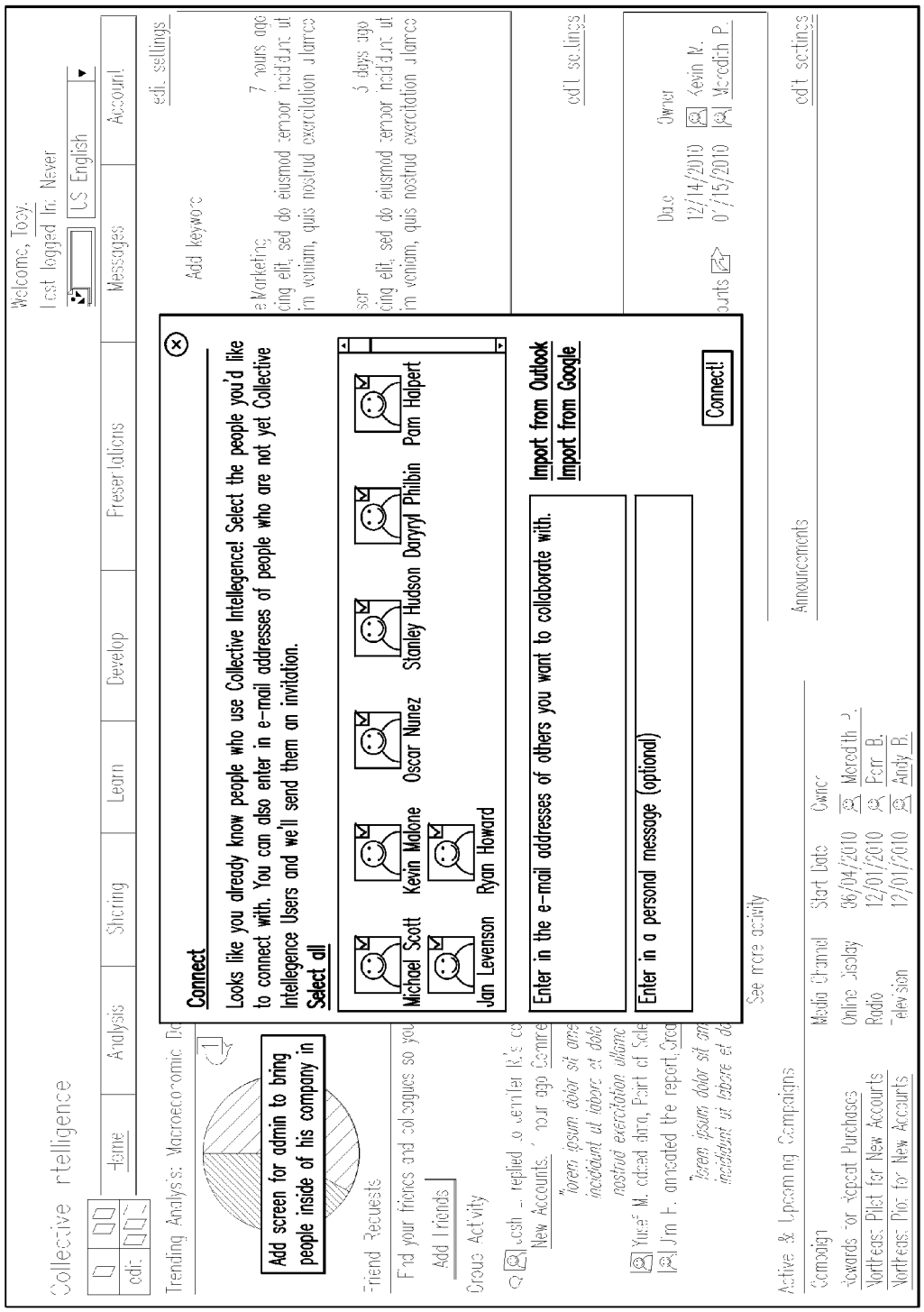

In FIG. 6, the CIS displays a list of people that the user may know that already use CIS, and allows the user to request connections (or request "friend" status) to these other users.

An illustrative embodiment of a CIS user homepage is shown in FIG. 7. This page comprises a selective layout optimized for comfort of viewing and maximization of productivity. By grouping and displaying the appropriate information, as shown in FIG. 7, the user is not overloaded by extraneous information but still has enough information to effectively engage in their data analysis operations. In a preferred embodiment, this homepage is customizable by the user. The top of the homepage includes a navigation bar, including links to: home, analysis, sharing, learn, develop, presentations, messages, and account. The homepage is customizable and may show a Trending Analysis for website traffic which displays relevant charts and graphs. The homepage also shows friend requests (with options to add, ignore or add to group), group activity which is a stream of information relating to updates or comments within the user's group or organization, a schedule of upcoming events, and announcements.

Figure 8:
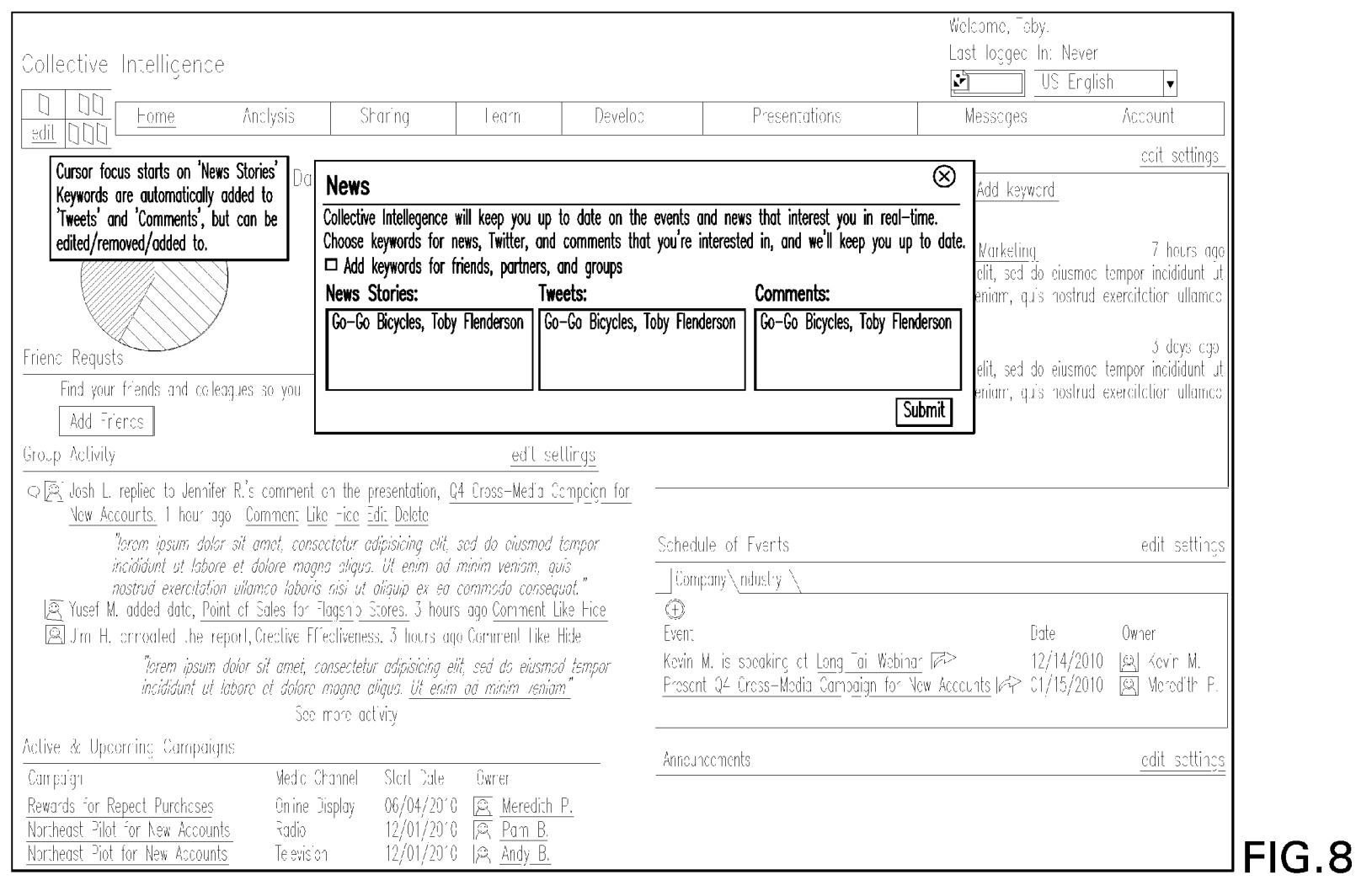

The homepage also displays news headlines, Tweets, and blog comments (collectively "feeds") in a streamlined fashion, as shown in FIG. 7. Specifically, the feeds are within a single module, but are organized by tabs for each of news, Tweets, and blog comments. In FIG. 8, the system sets up the user's feeds. It does this by searching for relevant feeds and relevant posts within feeds. For example, the system defaults to searching news stories, Tweets, and comments related to the user's organization and/or name. The user may customize the feed search criteria as desired.

Figure 9:
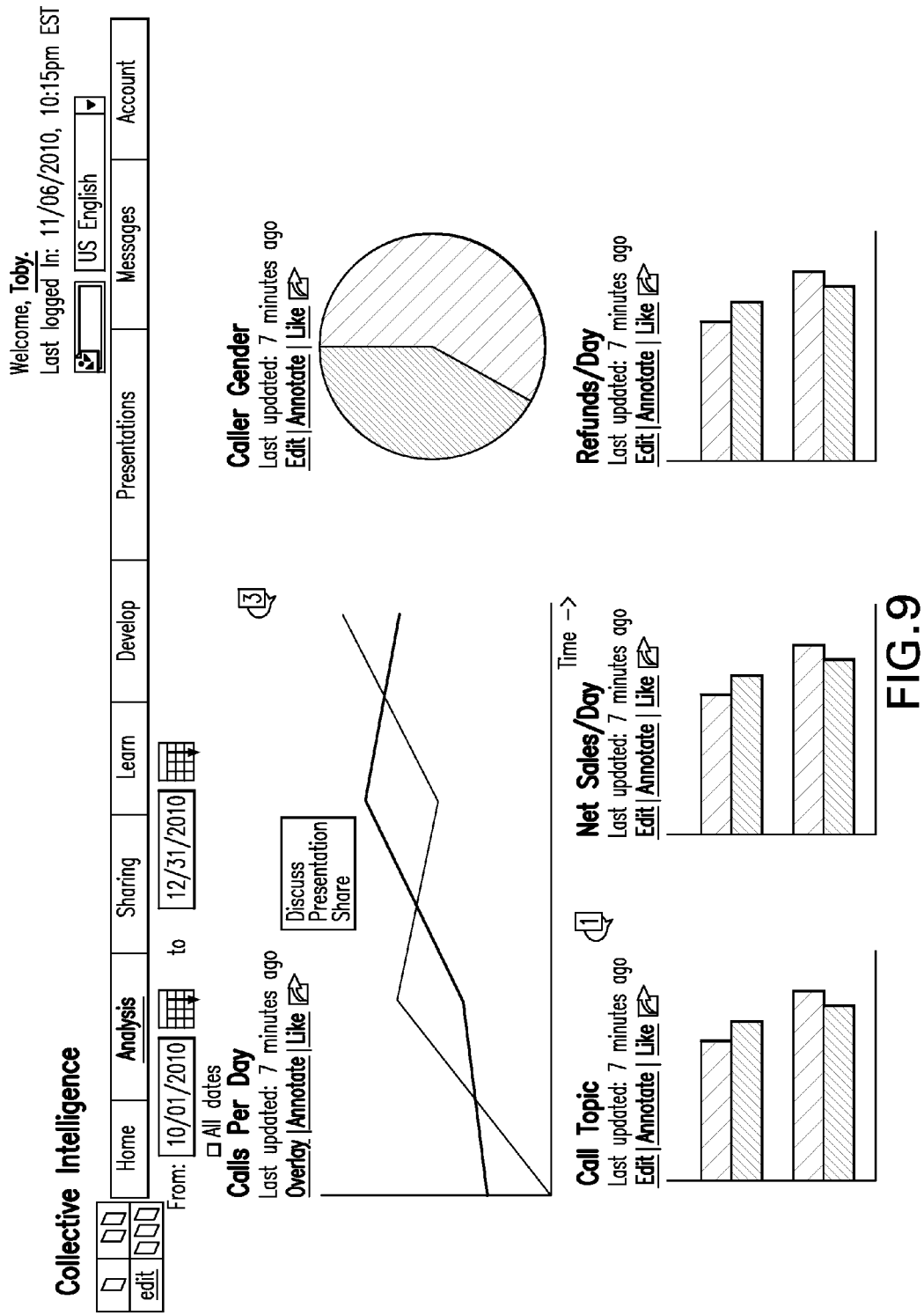
Figure 10:
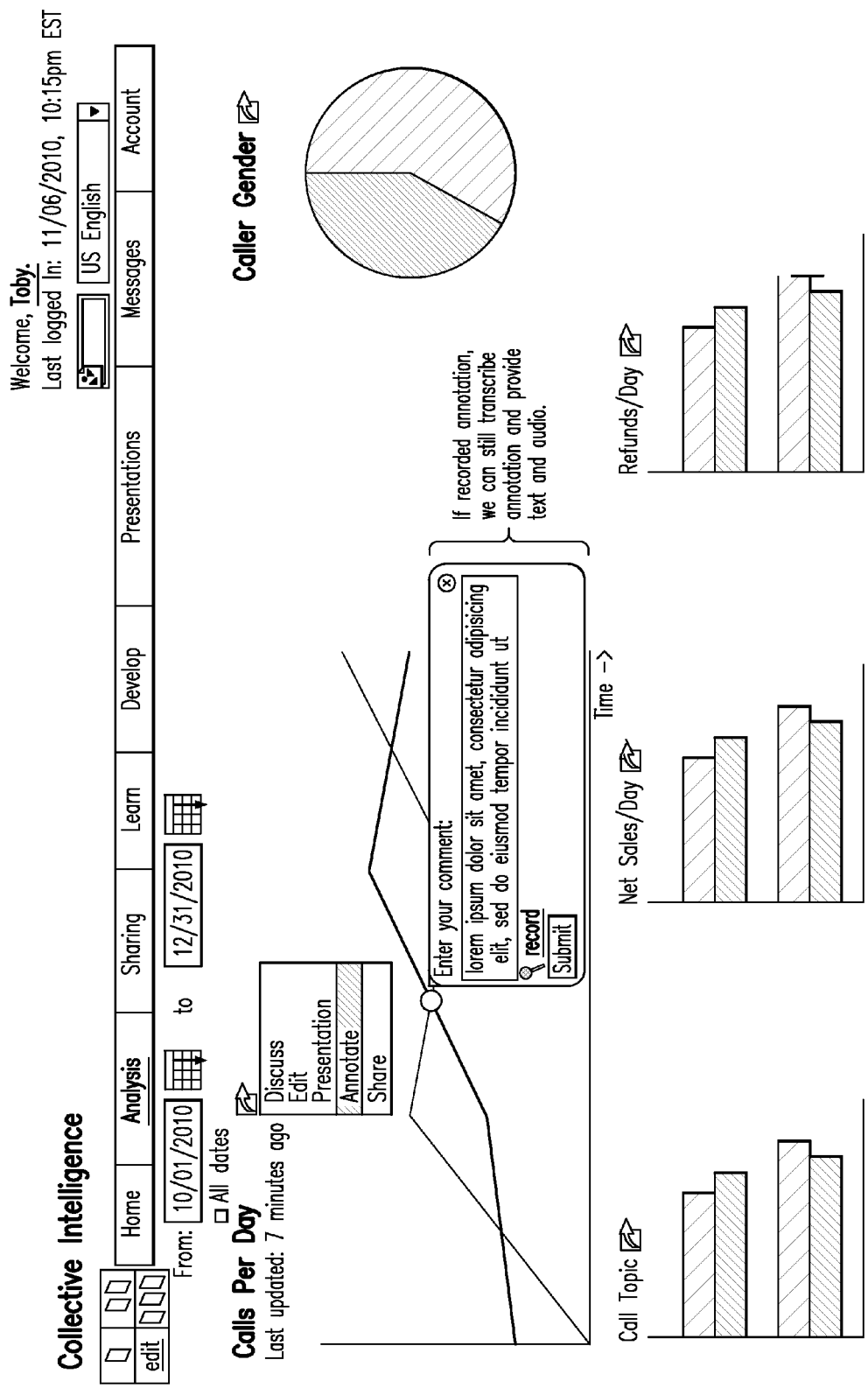
Figure 11:
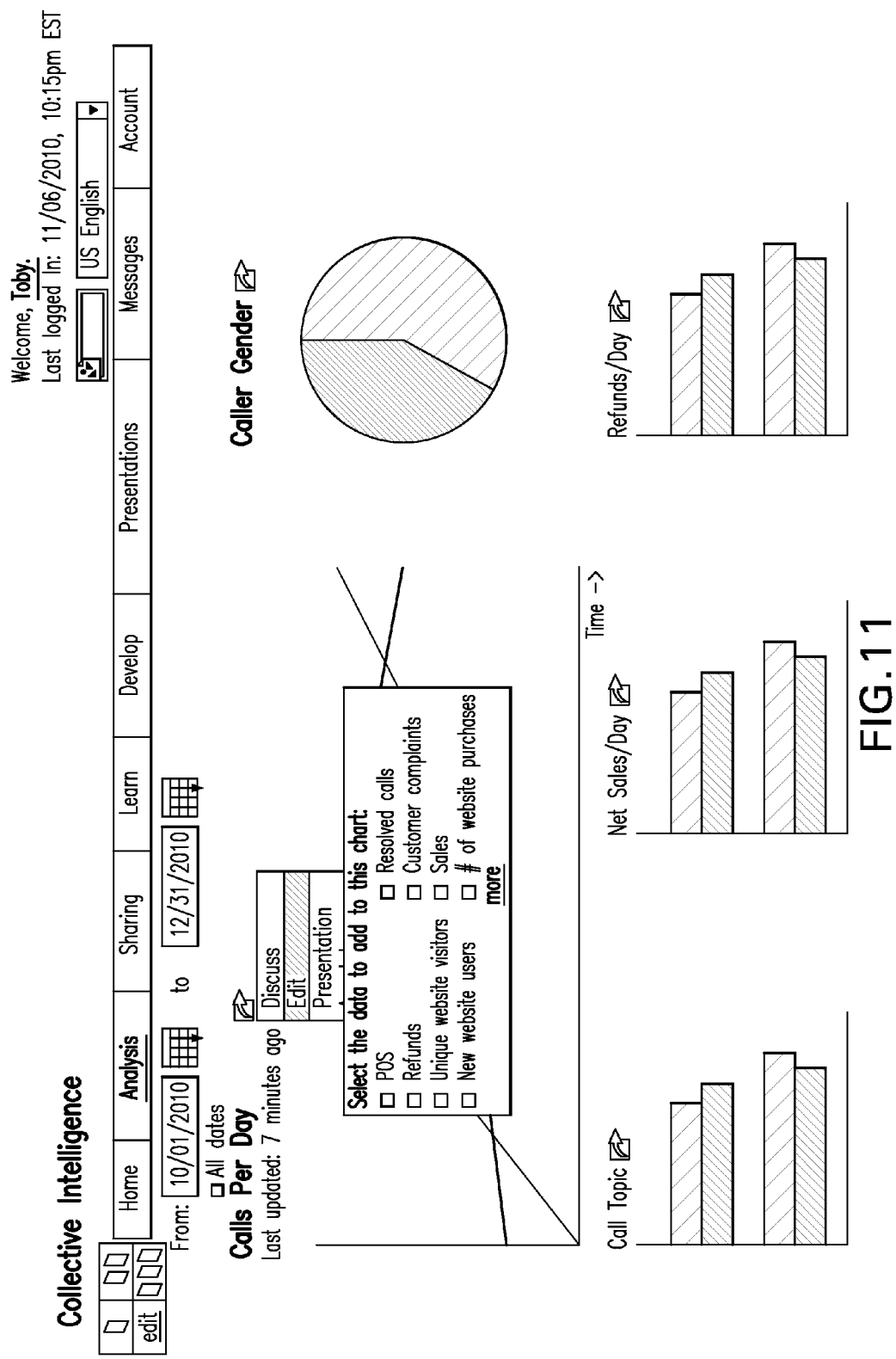

FIG. 9 shows the analysis screen. In this example, the data being presented includes, for the time period of Oct. 1, 2010 to Dec. 31, 2010, calls per day, caller gender, call topics, net sales per day, and refunds per day. The items displayed on the analysis screen are dependent upon the data sets being used, and may be adjusted. For example, demographics other than gender (such as age) may be shown if available. In FIG. 10, the user has clicked on a particular point in the calls per day graph, and enters his comments on this data point. In FIG. 11, the user is presented with the option to include additional data to the chart, including point of sale (POS), refunds, unique website visitors, new website users, resolved calls, customer complaints, sales, and number of website purchases.

Figure 12:
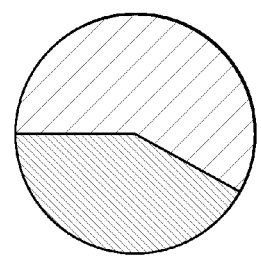

If a user wishes to share a particular report, data set, or data point, they may do so (if they have appropriate privileges) through the CIS by clicking a button and entering the name (if they are in the CIS network) or email address of the person they wish to share the information with, as shown in FIG. 12. Alternatively, the site may be shared through a social networking web site. The user will be able to share the exact view they were looking at. For example, a user may be looking at the widget sales data for last month, and may have noticed a large spike. They may zoom in on this data point, mark it with a comment, such as noting that the spike occurred the day after a complimentary widget product was put on sale. The first user can send their view of the report to a second user, and that second user will see the same screen that the first user was looking at when they clicked the "share" button. The second user would not simply receive a screenshot, they would be able to zoom out or manipulate the data set(s) as desired. Additionally, the second user accessing the site via sharing could be tracked back to the first user, and this data fed into the system analytics.

Figure 13A:
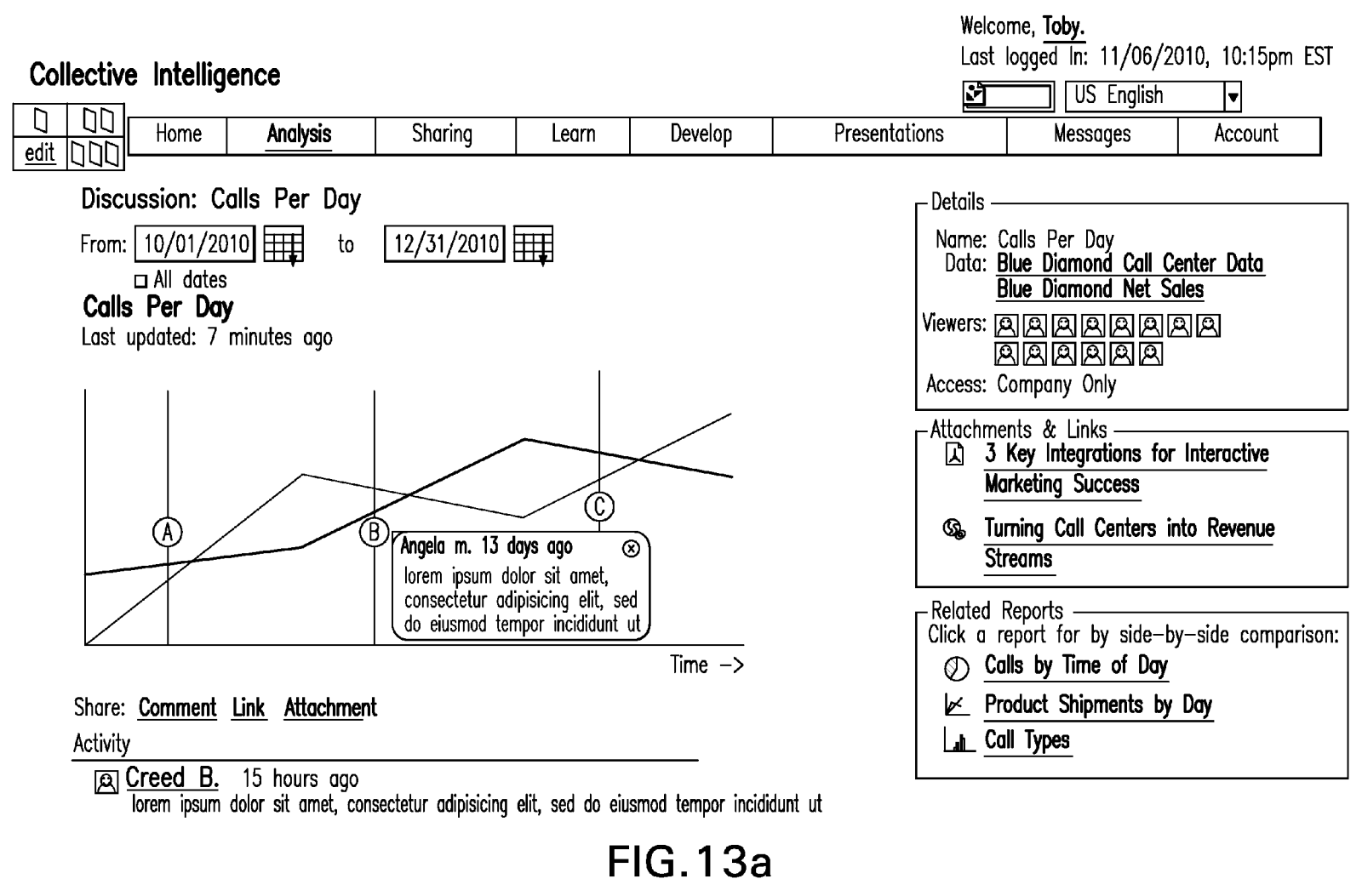

The discussion view allows users to comment on particular graphs, data set(s) or reports. As shown in FIGS. 13a-b, different users comment on the calls per day graphs. Not only are user comments listed under the chart, a marker is also placed directly on the chart to indicate which portion of the data the user is commenting about or referring to. This view additionally shows the details of the data being viewed/used, who has viewed the report, and/or who has access to the report. Also provided are relevant links and attachments, including links to related reports with an optional side-by-side comparison.

Figure 14:
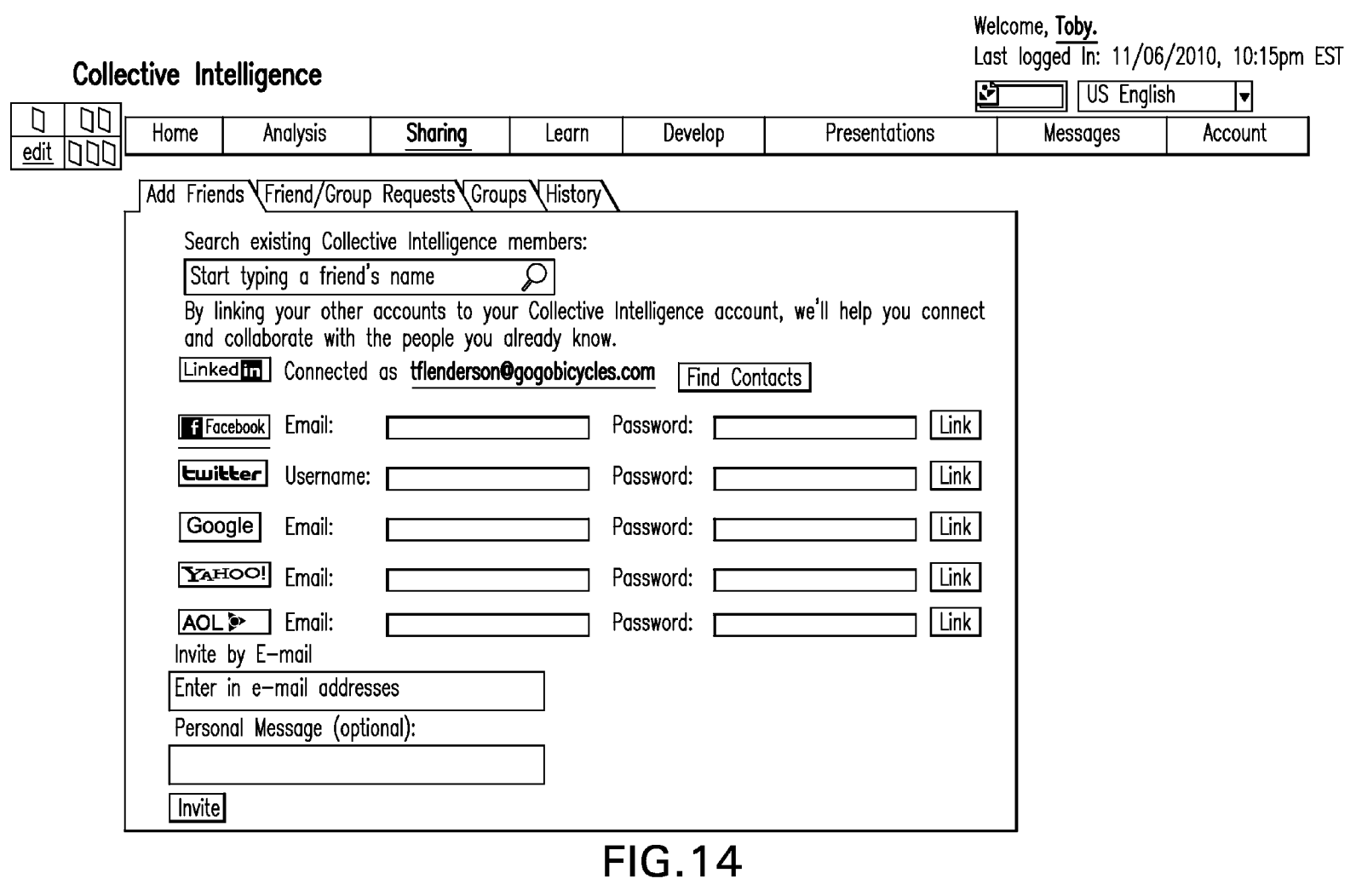
Figure 15:
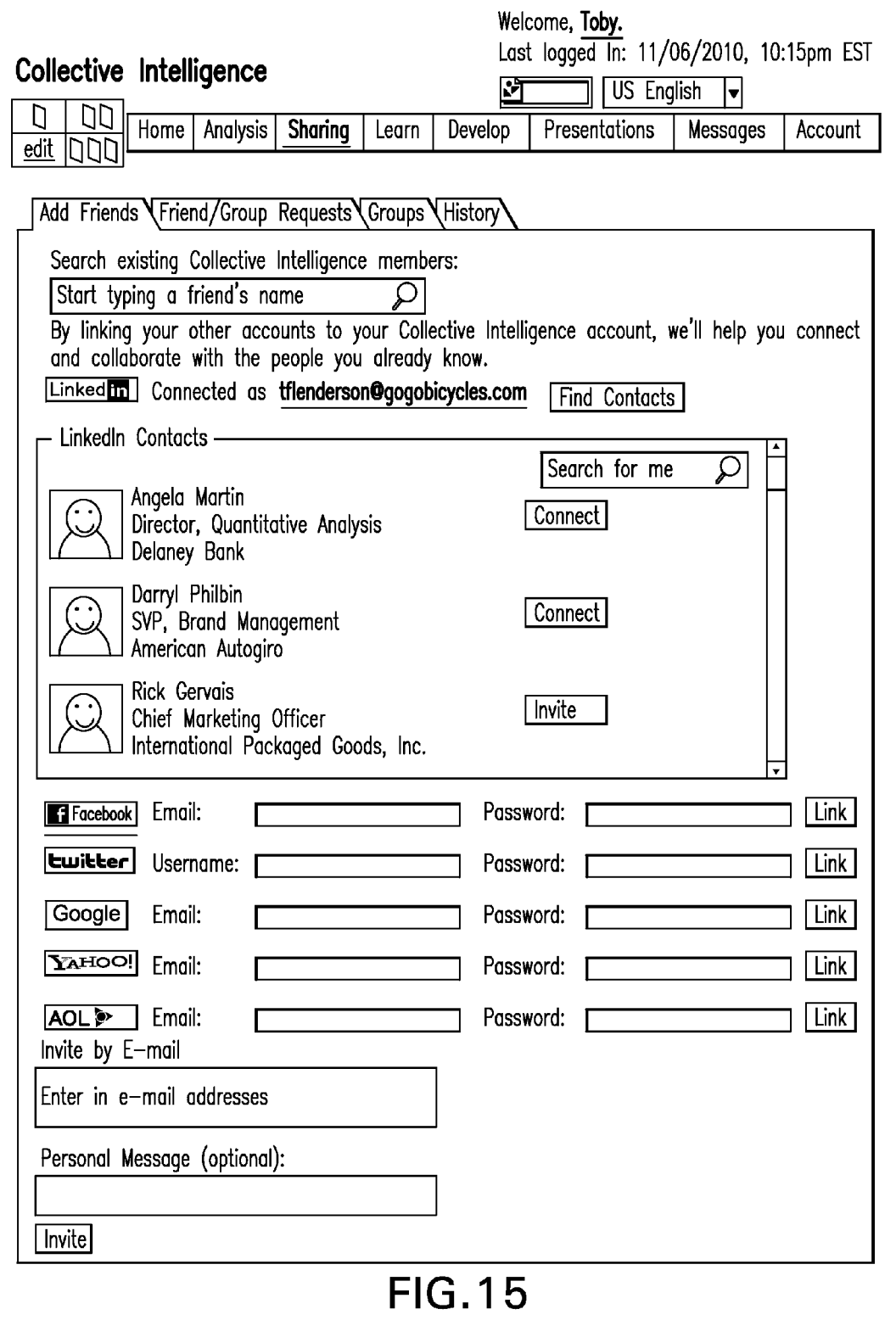
Figure 17:
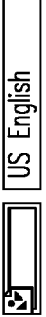
Figure 18:
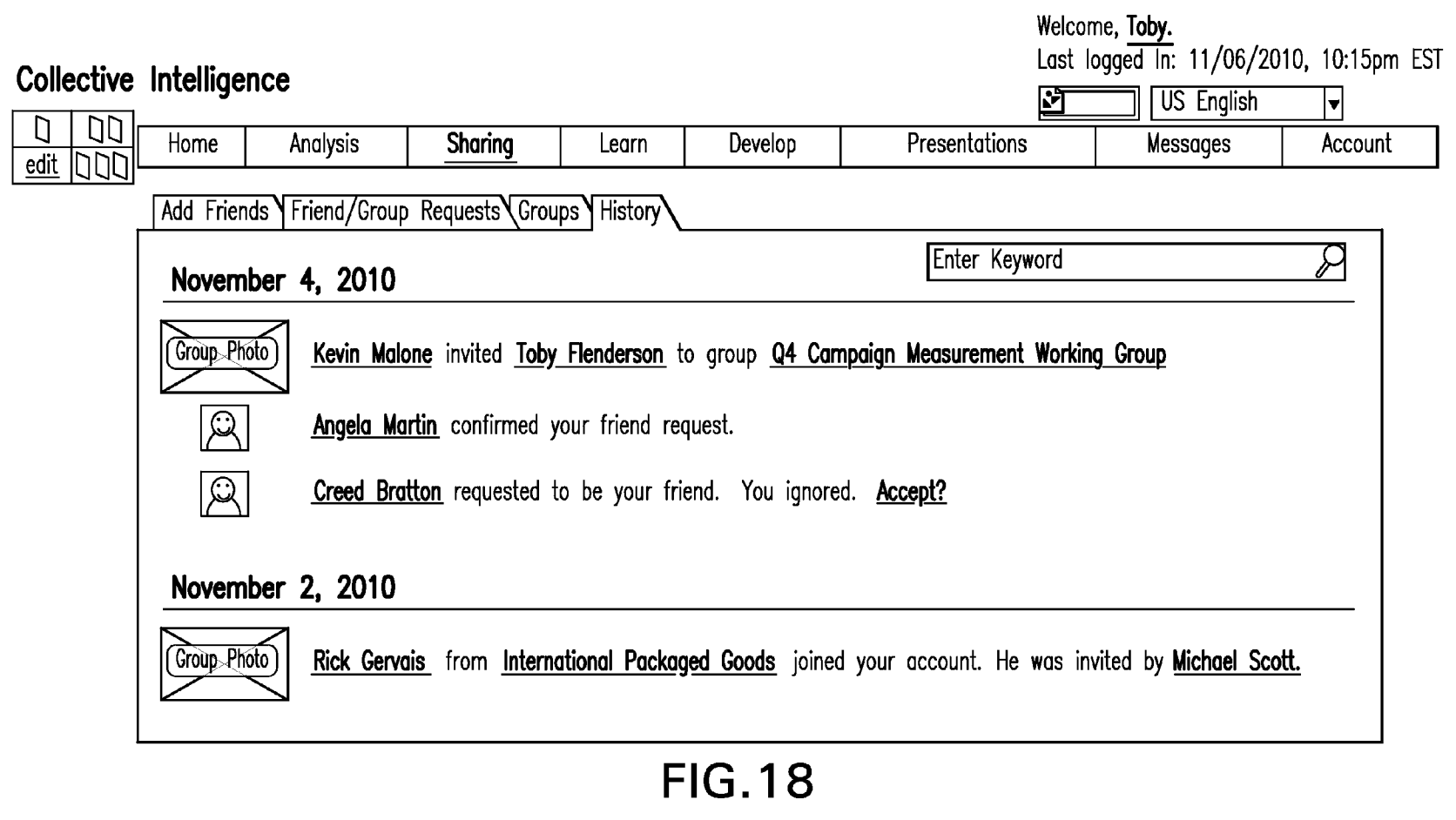

FIGS. 14-15 show the "add friends" feature of the CIS, including importing contacts from other networks (LinkedIn, Facebook, Twitter, Google, Yahoo, AOL, etc) to be added as friends. In FIG. 16, the system displays the friend and group requests received by the user, along with the options to accept the request, ignore the request, or add it to a group. FIG. 17 shows a user's groups along with their descriptions, and provides links to the group pages. This page also provides the options to create a new group, or browse groups to join. In FIG. 18, the system displays a user's friend and group request history. In FIG. 19, a user creates a group and the system asks for information about the new group, such as name, members, logo, group type, brief and full description of the group, the creator's email address, language, and the access level (open for all to join, only those in the same organization as the creator may join, must request permission to join, or the creator may pre-approve users with specified email domains). The system can optionally determine the group's industry by the industry of the group's members.

Figure 20A:
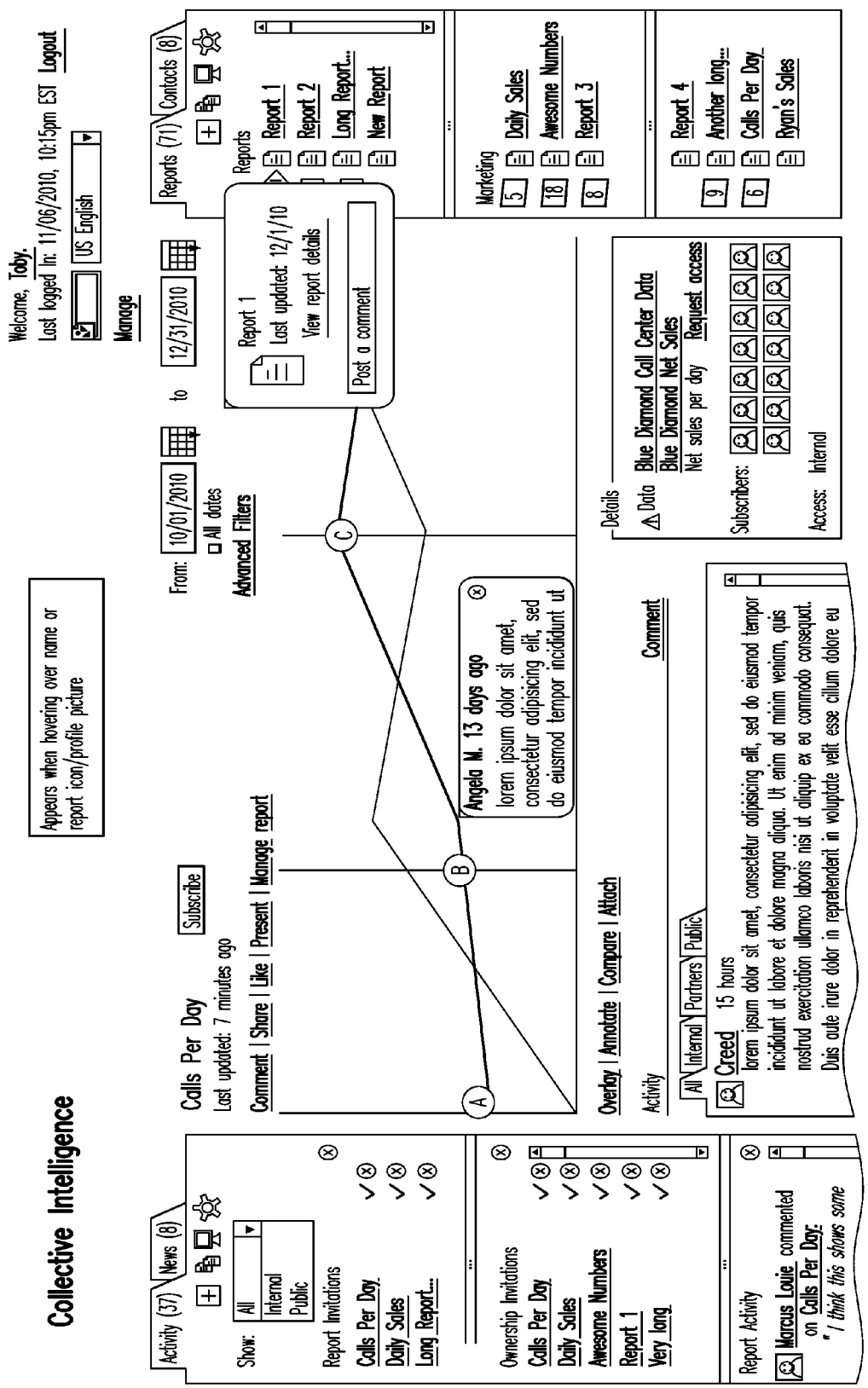
Figure 20B:
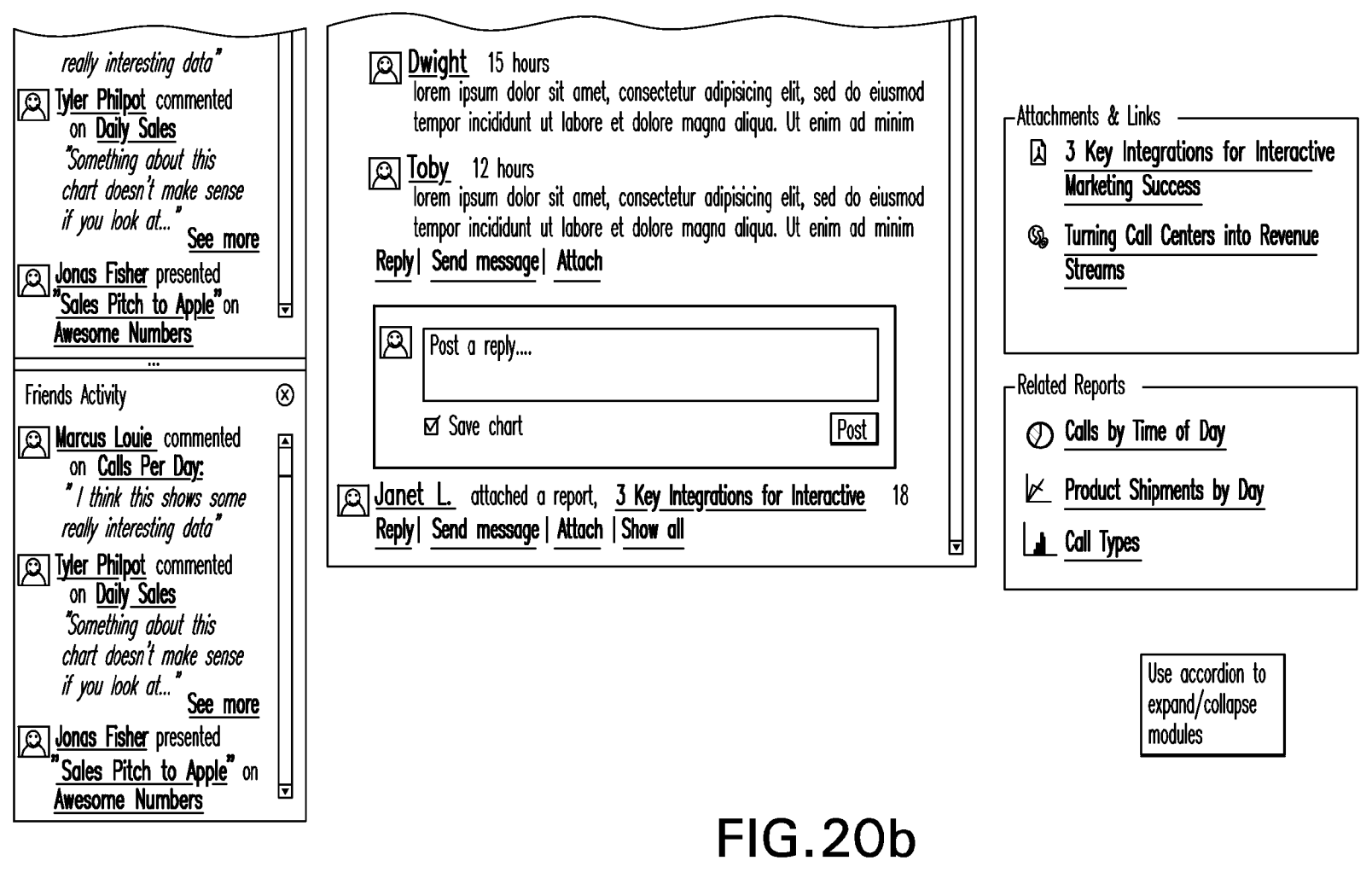

Another embodiment of a user's home page is shown in FIGS. 20a-b. Again, this home page comprises a selective layout optimized for comfort of viewing and maximization of productivity. This home page contains an activity and news tab, within a single module. Each of the tabs can optionally be viewed by the user. Similarly, the home page contains tabs for reports and contacts within a single module. In the middle of the page, the user's default or primary report graphic is shown, in this case calls per day. The report may be filtered by a date range, or the advanced filters options may be selected for additional filter options. Activity for the report is shown beneath the graphic, which includes filters to see comments from all users, internal users only, partners only, or public users only. Also underneath the graphic are details of the data set(s) used in the report, subscriber information, access information, relevant attachments and links, and links to related reports. Any of the modules in the home page may be selectively removed or minimized by the user to optimize the limited viewing space for that particular user. In FIGS. 20a-b, the displayed report has three comments made directly on the data set, represented by points (a), (b) and (c). The user has clicked on point (b) causing the system to display the comment made with respect to that data point. The user has also hovered over Report 1 listed in the reports tab causing the system to display report information, such as the date the report was last updated. Additionally, when other users are actively viewing a report, the icon associated with that report in the report tab changes color (e.g. green) to indicate this activity.

Figure 21A:
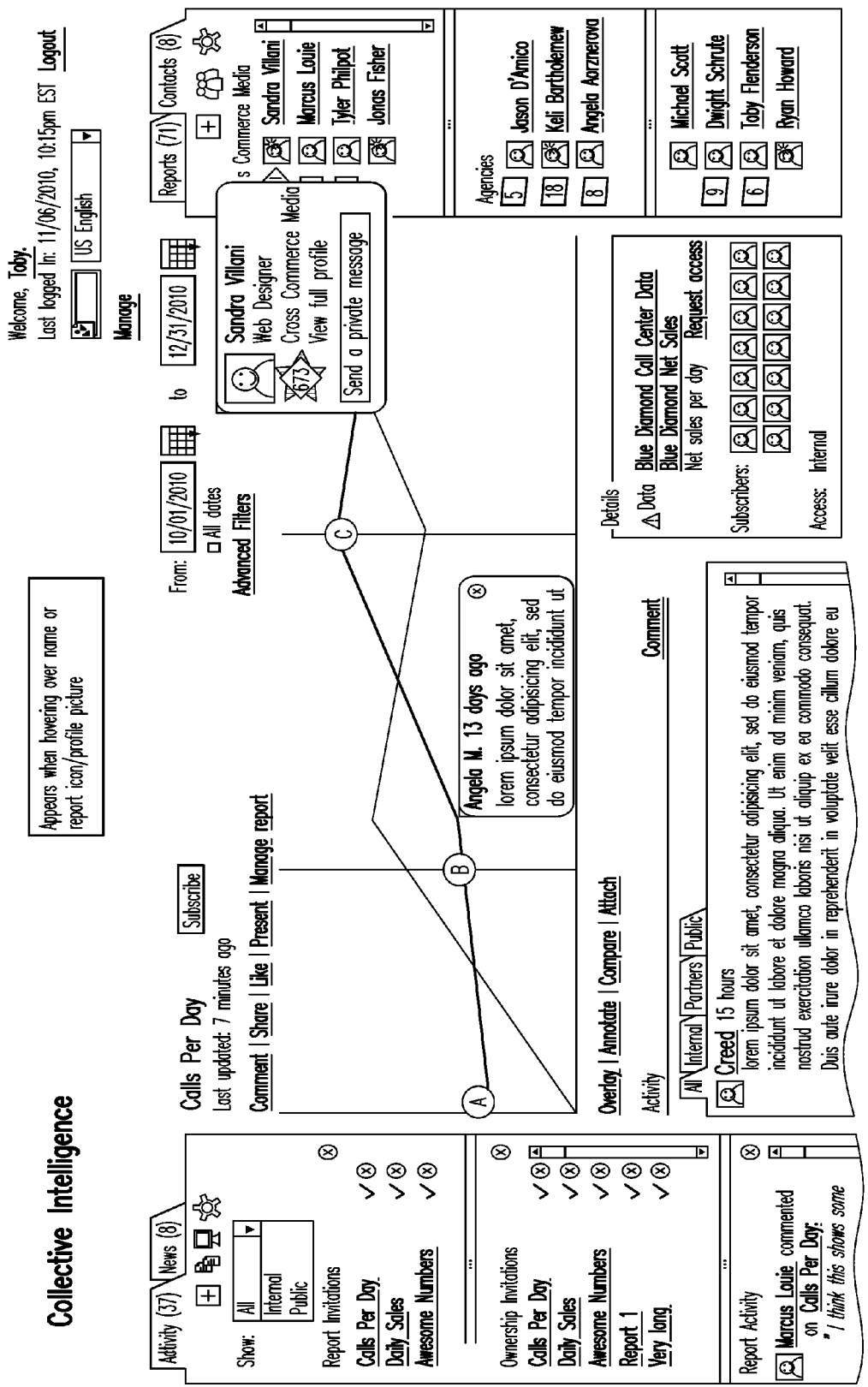
Figure 21B:
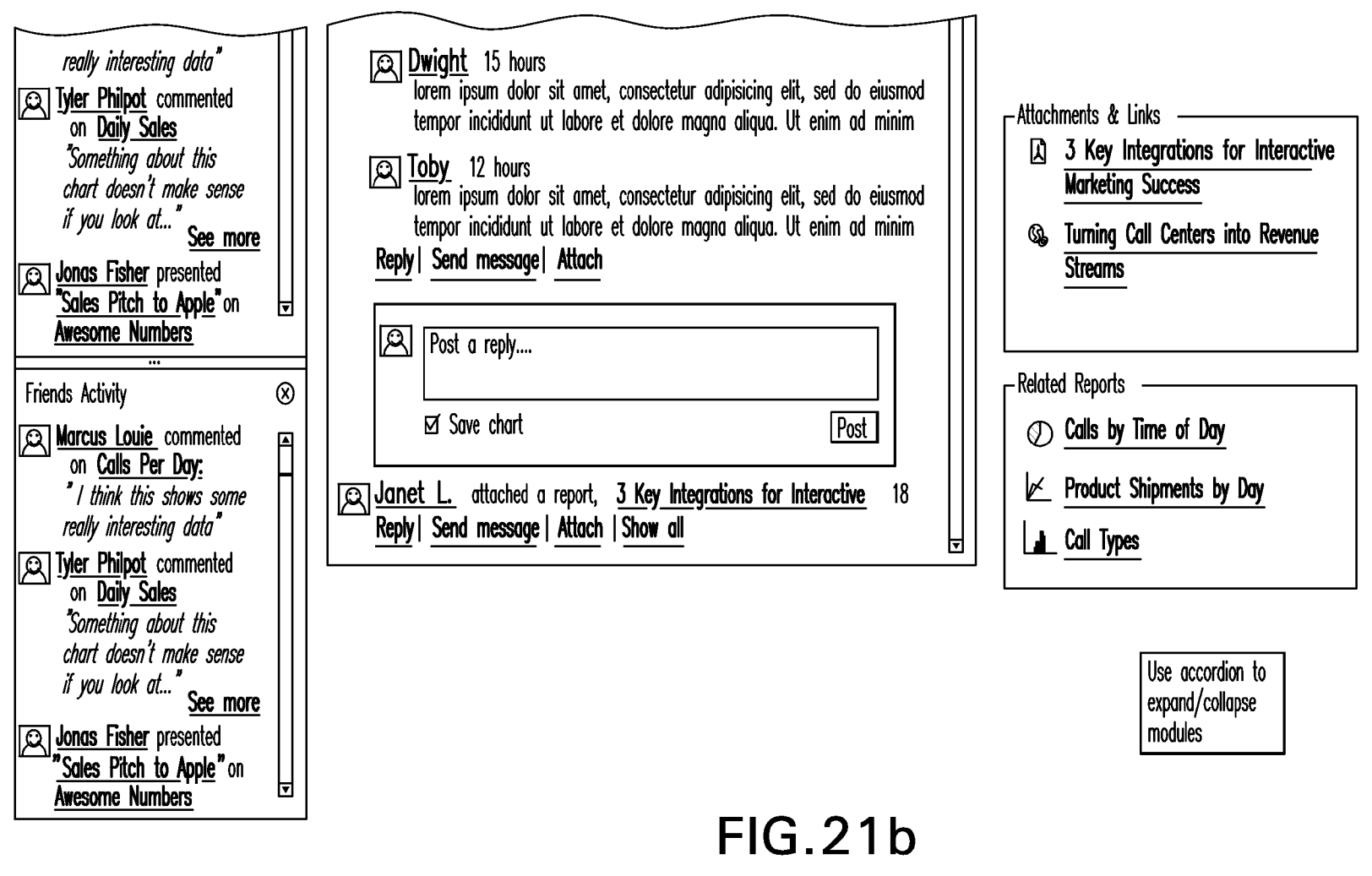
Figure 22A:
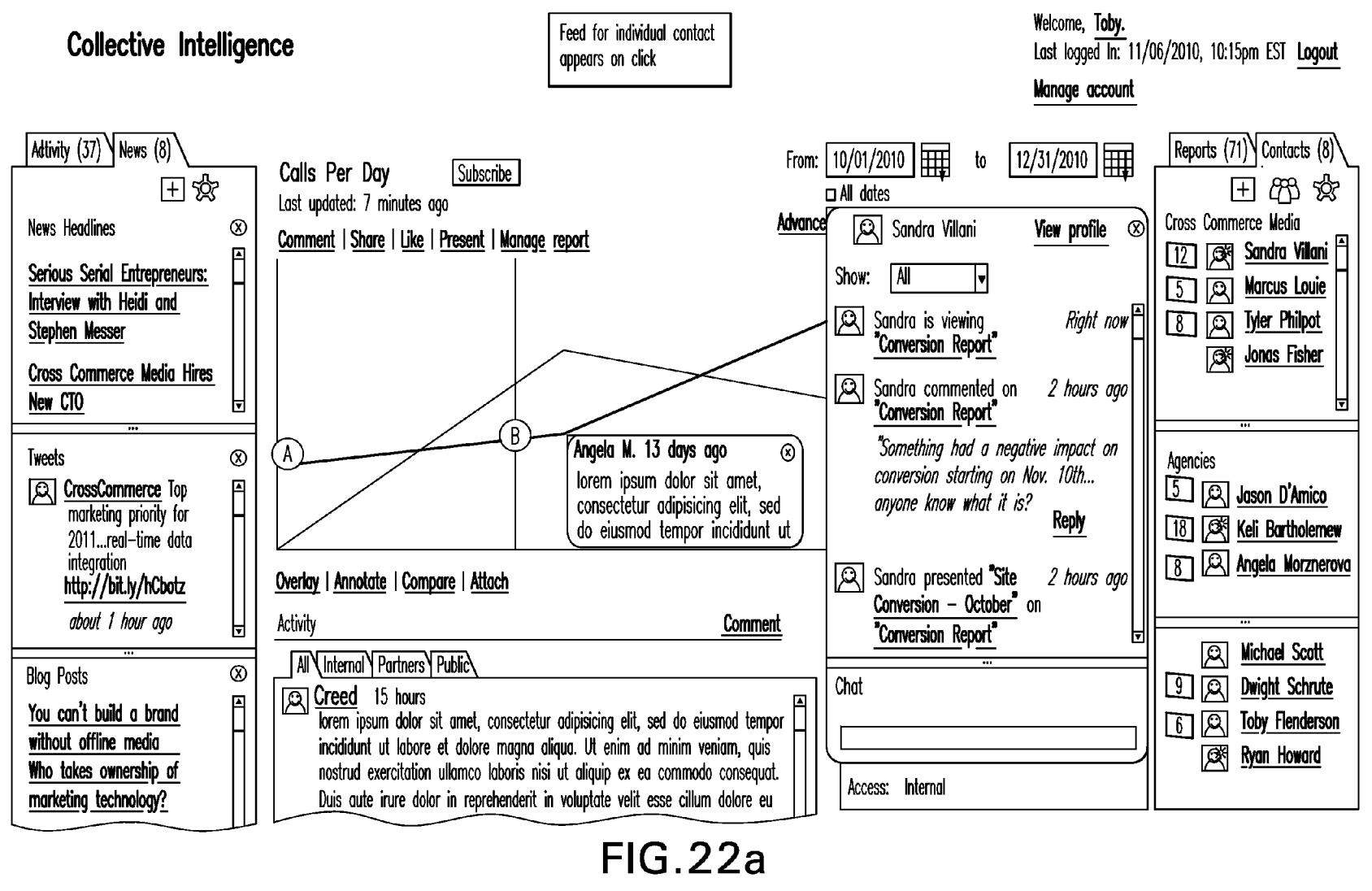
Figure 22B:
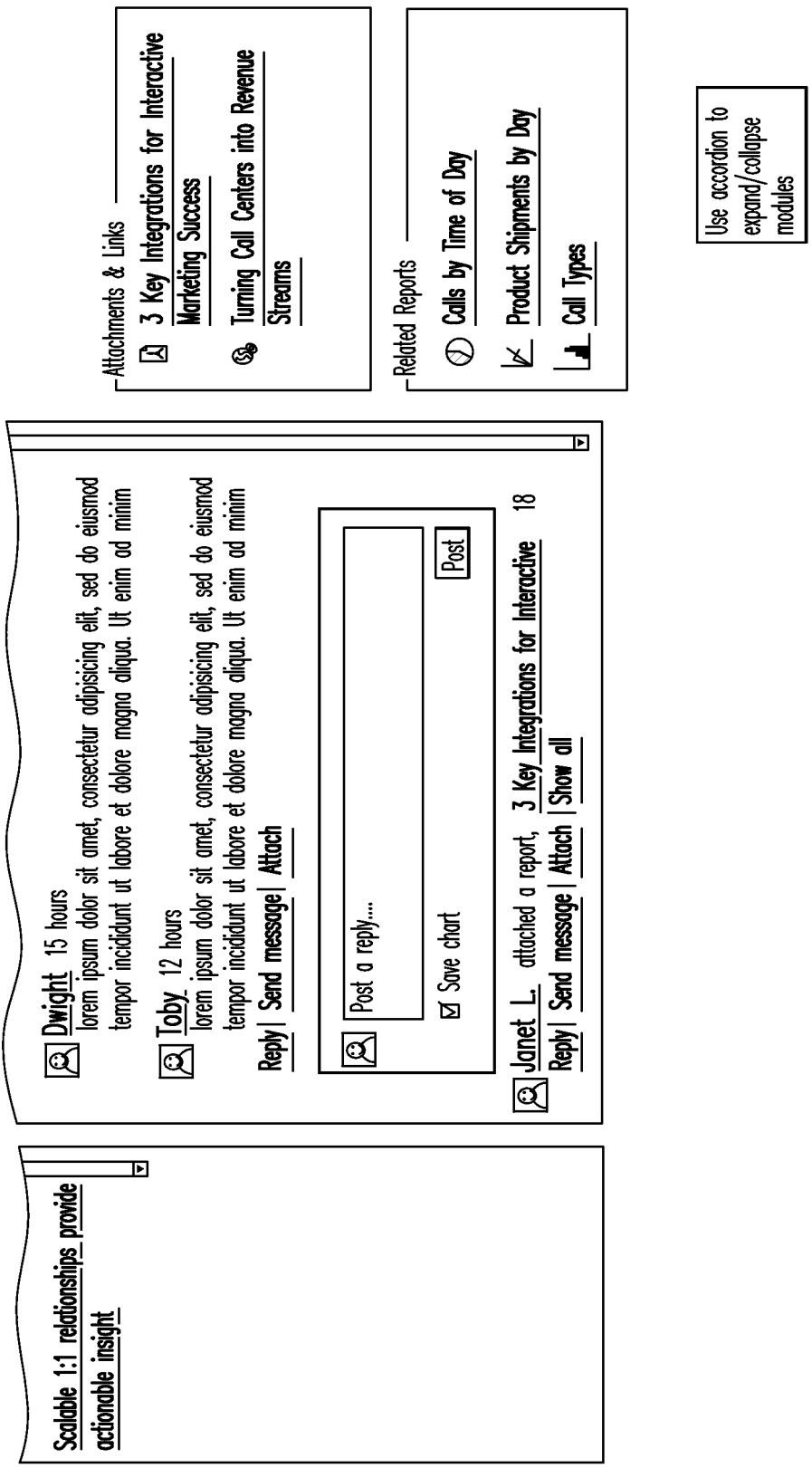
Figure 23A:
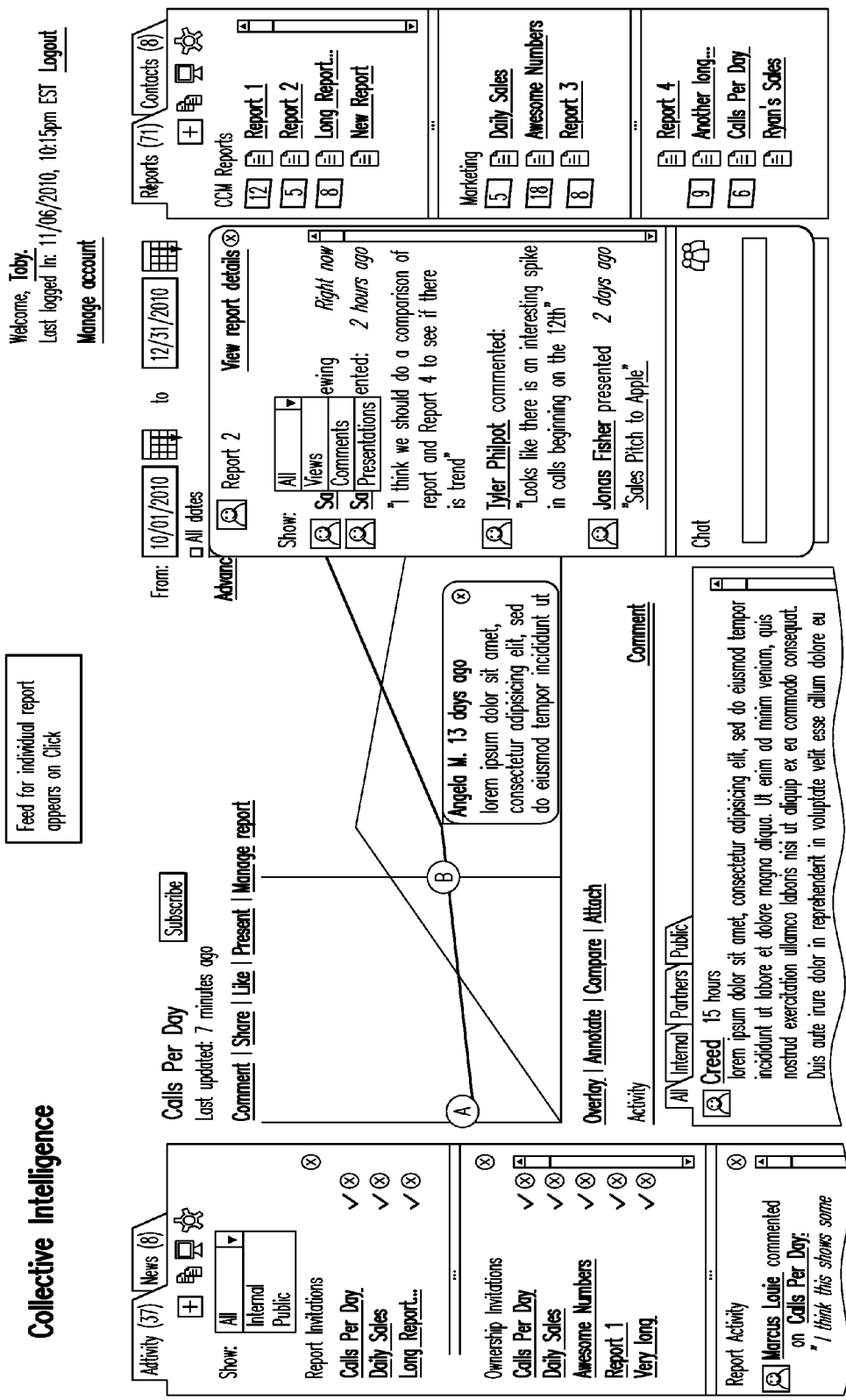
Figure 24A:
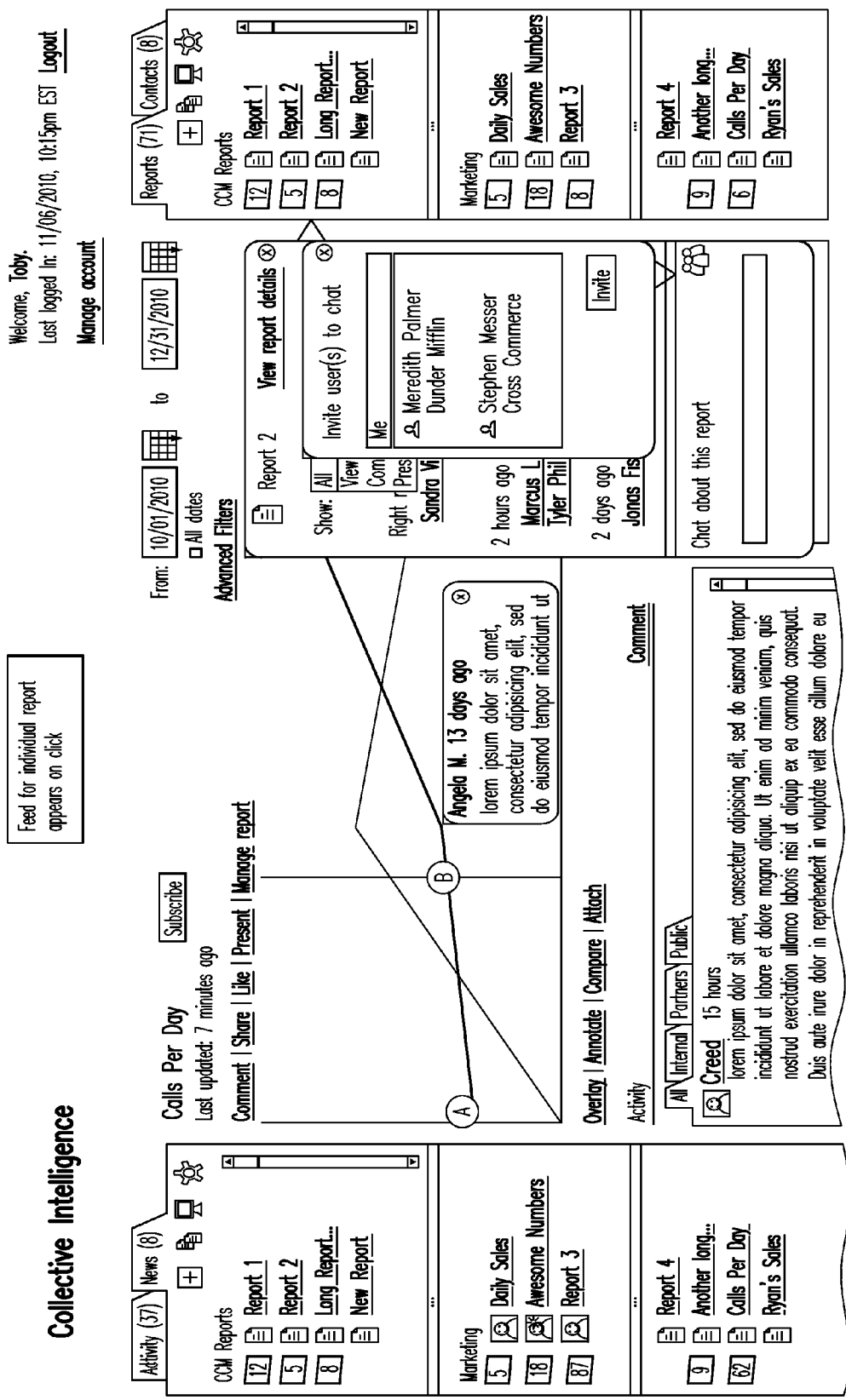
Figure 24B:
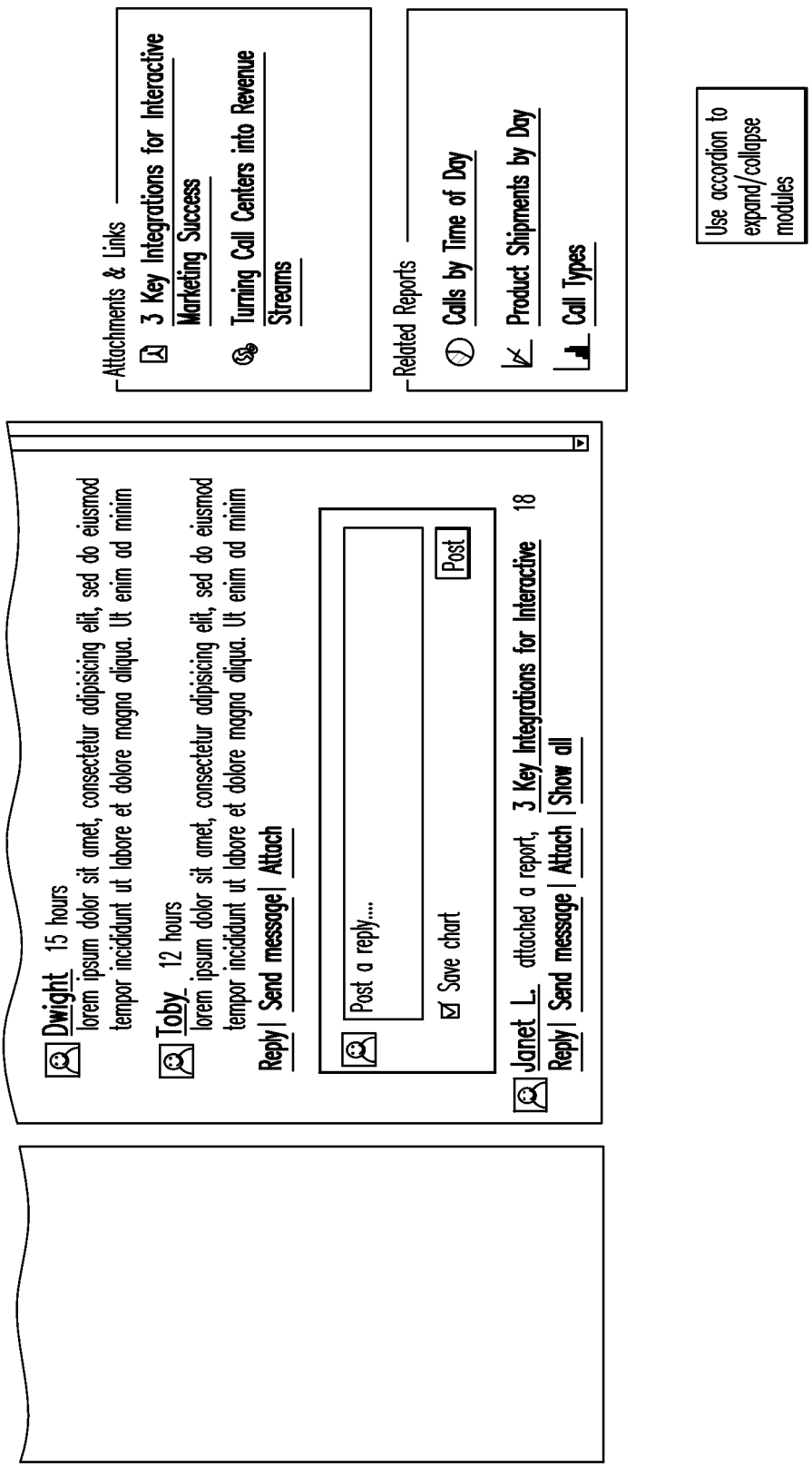

Continuing on to FIGS. 21a-b, the user has selected the contacts tab and hovered over a contact causing the system to display contact information such as organization, position, IQ, and the option to send a private message. In FIGS. 22a-b, the user has clicked on the contact causing the system to display the contact's activity feed, and providing the option to chat in real-time. In FIGS. 23a-b, the user has selected a report from the reports tab, and the system displays a report preview box containing the activity and comment feed for that report within the home page. Continuing with FIGS. 24a-b, the user clicked on the chat about this report button within the report preview box, and is selecting users to invite to chat in real-time about the selected report.

Specific work-flows of the CIS will be discussed below.

First-Time User

A first-time user will be asked to register with the system website. For each new user, a history is created of how they came to the system website. This tracking can be done, for example, by promotion codes or cookies, or other means known in the art. After the user enters their organization/work email address, the system will determine whether the user's email domain is in the system. If it is, the status of the organization's account will be determined (whether it is a paid or free account, or whether a trial account is available).

If the domain is not in the system, organization and user information will be collected, and in a preferred embodiment, this information will be imported from an external source such as LinkedIn. The system will send an email with a verification link to the registered email account.

After logging in, the user will be prompted to create user-level relationships through friend-requests. The system may suggest friends to be linked to based on user information and organization information. For example, the system may suggest a user to request friend status with another user who works at the same organization, or another user that shares a similar/complimentary interest or profession. The user will also have the option to search or browse users, organizations, and groups and manually select friend or relationship connections.

Homepage

A user's homepage will be displayed once the user signs in. This page may display friend requests, headlines/tweets/comments, trending analyses, and widgets. In a preferred embodiment, newsfeeds, tweets and/or RSS feeds are generated by relevancy searches based on keywords. Default keywords include the organization name associated with the user and other information that may be derived from the user's account information. The user can optionally edit or add keywords for focused homepage feeds.

Analysis—Manage User's Report Tabs

When a user joins a group the group will be added to their group report tab, or a new tab can be created for a group. Additionally, alerts can be sent when new tabs are available because of a group join. This alert can, for example, notify the user that they may freely modify one or more of the group's report.

When a user logs into their homepage, a list of all report tabs that are available for that user is displayed. The user may edit their report tab by changing names or descriptions of reports, creating additional reports, removing reports from the report tab, or adding reports to the tab. If the user chooses to add reports to their report tab, the system will show the user a list of reports available to them, including reports made by the user's groups. The user can also search for specific reports to include in their report tab, such as a friend's report. Once a user selects a report, the system will determine what data sets contained in the report the user has access to (based on their permissions/rights), and give the user the option to request or buy missing data sets, if appropriate. The system may update (or publish to) the user's activity board and/or notify other users who subscribe to the user's tab of the changes to a user's report tab.

Analysis—Manage Organization's Report Tabs

An organization can manage their report tabs similarly to users. An organization is given the option to remove reports from their report tab, edit reports, and create reports. Editing may include changing the report name and/or description, choosing which reports to include in the tab, and choosing user profiles or roles (such as owner or administrator) to make the tab visible for. Creating a report tab may involve entering a name and description for the tab, choosing reports to include in the tab, and choosing user profiles or roles to make the tab visible for.

Analysis—Report Settings

When a user selects "Edit" on a chart or report, that user will be presented with a number of options. For their own view, each user can add and/or remove data to the report, change the name of the report, and change the names of the data labels. Unless the user has appropriate privileges (such as account owner), this will not affect other users. The report owner can change the default names and data labels. Other users will be notified of these changes but can choose to accept them or keep their current data/settings.

If a report owner chooses to "Edit" or "Manage" a report, the system will provide the following options to the report owner: 1) invite other users to the report via a collaboration initiation; 2) change the internal data label name; 3) change the internal report name; 4) review requests to view the report, and allow or deny requestors access to the report. If access is granted, different levels of access may be specified, for example, by choosing which data sets the requestor may or may not view; 5) manage frequently asked questions. The system will list existing questions associated with the report. The owner may then add new questions and answers (or editable field for others to answer), edit existing questions or confirm answers to editable answer fields, or forward questions; 6) edit the curated list of data to use with the report; 7) view where the report has been used or shared. For example, the system may show (over time periods) which presentations have used the report, if and when those presentations were given, who publicly shared the report and over what channels (e.g. Twitter, Facebook, and LinkedIn). This data may be filtered, for example, by time period or channel; 8) view the history of the report usage. The system may display a list of users who have accessed the report and groups who use the report, as well as how often and when these accesses have occurred; 9) edit internal description of the report; 10) contact report builder regarding the report; 11) change report visibility. The owner can determine who will be able to see the report, for example by user role, and the system may provide a summary of changes preview showing who will be able to see the report based on the changed settings. Optionally, this feature may only affect new users so that if someone subscribes to a report they will maintain their access to it even if new visibility settings would preclude them from newly subscribing.

Analysis—Discussion

When viewing a report a user may select an option to view the discussion page for that report. The system will then lookup the settings for that report discussion page and determine which data the user has access to in the report. Optionally, the system shows the user which data sets are not shown because of inadequate permission and/or which data sets the user would need to purchase to access. The system then displays the report discussion page based on the appropriate settings and displays the report, report details, attachments, links to external web pages, links to associated reports and internal and external activity, as appropriate. The system will also display appropriate widgets or applications that are configured for the report and/or the discussion page.

Work flow with respect to each item within the activity board will be discussed briefly. When the user performs an activity on the report discussion page the system will determine whether the user who posted the activity is internal, public, outside of the system, a friend of the user, or a business. Posts that are made outside of the system (e.g., Facebook, Twitter, LinkedIn) are captured on the report discussion page and links to outside hosting sites are also provided. The user will also have the option of editing and deleting their own posts, and/or making their posts private to specific users, available for only internal users, or available to all. The user will also have options to reply, hide, like comments, private message, and chat.

Depending on the settings for the page, the user may have the option to comment about reports or activity diagrams, attach documents (and choose their visibility to other users), use widgets, remove associated reports from screen, show/hide associated reports, reply to or hide an activity item, filter activities (by people outside the organization, people within the organization (internal), or by internal and partners), edit activity settings including which activities to see by default, invite people to view reports or collaborate on reports, and unsubscribe from a report.

Analysis—Discussion Page Settings

When a report owner is viewing a report, they may change the report's page settings by selecting the "Edit" button. This will give the owner the option to add/remove widgets, toggle default activities shown, and edit who can see the report. If the owner is adding widgets, the system will present a list of available widgets, and if required, will prompt the owner for payment for any selected widgets. The system also gives the owner the ability to remove widgets from everyone's view or just new viewers. The owner can also select which activity is shown by default—internal, external, or both. Additionally, the owner can select who has permission to see the report. For example, 1) only users in the organization, 2) all users in the organization plus the owner's external contacts, 3) all groups/users, or 4) users and groups who have access to another specified report. The system also provides a search tool to find users and groups to add.

Analysis—Manage Reports

In a preferred embodiment, a sidebar will display a list of reports that the user is currently subscribed to. The system can recommend reports based on a report or report tab currently being viewed, and/or may recommend reports based on what friends are subscribed to. These recommendations may be prioritized, for example, by which reports are used/viewed most often, which reports are owned by friends, etc. The user may also see a list of available unsubscribed reports, subscribe to reports, or unsubscribe from reports. If the user tries to subscribe to a report, the system will check whether the user has permission to access the data contained in the report, and when appropriate, give the user the option to request or buy the data if not currently viewable by the user. The user will also have the option to add the report to multiple report tabs. In one embodiment, the current report tab is the destination for newly subscribed reports.

Write Message About Report

Users may write messages related to reports, including writing comments, replying to comments or writing private messages. When viewing a report, the user is presented with report options, filter options and a text area to enter a message. When sending a message, the user can select a message type (private or public). If the user chooses to send a private message, they can select the desired recipient, and the system will indicate which data in the report the recipient does not already have access to. The user may then select which data in the report to give the recipient access to (if they have appropriate permission to do so). The user then chooses which view of the report they want to send. In a preferred embodiment, the default view to send will be the view the user has of the report before selecting the messaging option. The user can write and send their message, and if the user selected to share their view, the recipient will be able to see the user's view and filter settings at the time the message was sent.

Analysis—Overlay

A user may view a report on their viewing device. If the user wishes to overlay data on top of the report, the user may click the overlay option which will generate a list of data that may be overlaid. This data list could include data from the report's owner or could be from another source, such as the data the user and/or their organization has access to and can be overlaid into the report. The system may also generate a list of data that may be overlaid on the report, but that must be purchased. Additionally, a user viewing the report is able to set their view of the report to be their default, over the default view set by the owner of the report. The user may share their view of report, with or without the overlay.

Analysis—Send Collaboration Invitation

A user with appropriate permission can share a report or request another user to collaborate on the report. After clicking the report sharing button, the user will have the option to embed the report into a website, share with a friend, share with a group, or share publicly. If the user chooses to embed the report, the system will generate the appropriate code for the website and allow the user to copy the code to their clipboard. If the user wants to share the report with a friend, the system will display a list of connections and users in the same organization (and/or outside the organization), and the user can select one or more of these users to send a collaboration invitation to. The user then selects which data in the report to share. For each recipient, the system will indicate which data the recipient does not already have access to. In some instances there will be third party data in the report. In a preferred embodiment, the user must affirmatively select access to be given for this third party data. In one embodiment, if the data to be shared with the recipient must be purchased, the system will require payment from the recipient before allowing access the data.

If the user chooses to share the report with a group, the system will display the groups that the user belongs to, and give the user the ability to search across the entire system network for other groups. The user can either choose to collaborate with a group, or add a report to the group's report tab. The process flow is much like the process flow for sharing with another user. The user selects one or more groups to collaborate with and selects which data in the report to share. The system informs the user whether all users in the group already have access to the selected data, and sends the notifications. If the user wishes to add a report to a group's report tab, a group is selected, and the report tab activity flow is followed, and a report tab is created.

The user can also share the report publicly. The system will allow the user to specify sharing options, such as allowing comments, requiring sign-in for comments, when access to report expires, which accounts/domains to share with, whether users can interact/drill down/filter data in the report, and where the user should be taken if they click the report. The system will then publish the report or a link to the report to a website or location specified, such as Twitter, Facebook or LinkedIn.

Analysis—Receive Collaboration Invitation

A collaboration invitation will display which data sets within the report the user has access to and which they do not. A user must have access, or be given access to, at least one data set in order to receive a collaboration invitation. The invitation will also provide the terms and conditions of the collaboration. If the user accepts the terms of collaboration, the user will be granted access to the selected data, the user will be subscribed to the report, a notification that the report has been shared (including which data was shared and which users were involved) may be sent to the user who granted access to the new user, sent to the report owner, and may be posted to the activity boards of the organizations involved.

Analysis—Select Owner

Report ownership may be modified. If a user without administrative privileges requests ownership of a report, the system will send an appropriate request to the current report owner. If a user has permission to assign an owner to a report, the user may click select owner and the system will display a list of people associated with the organization, indicate the current owner, and indicate which users have full access. The user with administrative privileges may then select a user to become the new report owner and the system will then give the new owner the option to request or buy data associated with the report if not viewable by them. The system can also publish a story about the identity of the new owner, and optionally send a notification to the old owner.

Analysis—Unsubscribe from Report

If a user unsubscribes from a report, the system will first determine whether the user is the report owner. If the user is not the report owner, the system will remove the report from the user's subscribed list of reports, and may optionally notify the report owner. If the user is the report owner, the system will remove the report from the user's subscribed list of reports, and allow the user to select a different user to be owner or make the account administrator the report owner.

Friend Requests

A user may or may not receive friend requests that can be accompanied with a report or analysis. The request may additionally or alternatively require that the user receiving the request share certain data in order to confirm the request. For each request received, the recipient user can choose to ignore and remove from display (but store in history), show all the information on the requesting user and show the report/data/analysis that is being offered and/or the report/data that is being requested. If the friend request is accepted, the recipient user can access the data offered by the requestor. Optionally, the user can choose report permission settings for the recipient user (including the data sets to be shared). A similar work flow may be used where the recipient is a group. Optionally, the confirmation of friend requests can be posted to activity panels and/or the system can notify appropriate users.

Marketplace—View Listing

Users are able to go to an online marketplace to integrate new analyses, data and visualizations into their view. This allows users to extend the functionality of the CIS by using contributions from third parties. In a preferred embodiment, this marketplace is hosted or managed by the CIS (or other system facilitator). The marketplace displays a plurality of listings which include descriptions, prices, ratings, and links to videos, screenshots and other resources (e.g. case studies). Once a user selects a listing, the system may provide the option to try the application/data, and if selected, the demo can be installed in a read-only demo account, and a record of the user trying the demo can be sent to the developer for lead generation. The user may also view sample data, download attachments or view screen shots of the application/data, if available. If the user decides to purchase the application/data, the system will ask the user to agree to the application/data terms and conditions. If the application/data is free, it will be added to the user's account. If the application is not free, the system will determine if the user has authorization to make the purchase, and if not, prompt the user to send a request to the administrator or payment manager to authorize payment for the application/data.

Developer—Manage Data

Users are able to manage data by adding, editing or deleting data. When a user adds new data, the user must input a name and description for the data, and choose which geographic regions the data applies to (if relevant). The system will provide the user a list of types of possible data, the organization's custom data types, and provide an option to define a new custom data type. The user then selects which type of data is being provided and how often the data is updated (real-time, daily, weekly, monthly, semi-annually, annually, once only). The system will prompt the user for how the data will be provided (e.g. uploaded or posted to web service), and will retrieve the data accordingly. If the user is part of an account that can sell data the system will ask the user whether the data is for internal use only or for sale in the marketplace. If the data is for sale, the user will input costs, define customer support, choose who can maintain the data, and select access policies. The data costs could be based on one time fees, subscription, free, limited demo version, etc. In a preferred embodiment, if the user selects marketplace availability for the data (not internal use only), a prompt will be sent to the system facilitator and/or the organization/group administrator to review the data before it is made available in the marketplace.

The user may edit data, and in one embodiment must describe the changes. The change may require review by the system facilitator and/or the organization/group administrator. In one arrangement, the user is not allowed to change data type or frequency.

If a user wishes to delete data and has appropriate permission to do so, the system determines whether the data set is used in at least one report or analysis, and if so, the system determines whether it is used internally only. If the data is used internally only, the system notifies the users of the reports and analyses that the data is used in. The user wishing to delete the data is able to select alternate data to suggest to report builders and report owners, and then choose when the data will be taken offline. When the data is taken offline, the data will be removed from the data lists of the user, organization, and all reports and analyses that use that data. If the data is not only used internally, the system may determine whether users paid for the data.

In a preferred embodiment, if a user paid for the data, the data may not be deleted by another user. The system notifies users of other organizations that are using the data, and the work flow follows similarly to internal use only data deletion and the data will be removed from the marketplace.

Developer—Manage Report

The system will show a list of reports that the user maintains. The user can choose to create a new report, delete a report, or create a sandbox version of the report which is seen only by users who have permission to see a development version of the report. If the user chooses to edit a report, the system determines if a sandbox version exists, and if so, loads the settings of the sandbox version. Otherwise, the settings of the live version of the report are loaded. Once the user has finished with their edits, they can choose to "push" the changes or work on the changes later. If the user chooses to push the changes and the report is not in the marketplace, the user may describe the changes and push the sandbox version of the report to be the live report. If the report is in the marketplace, changes to the report may require review by the system facilitator or an administrator. The create new report and delete report workflow are similar to those described above. When the user tries to delete a report, the system will determine if there are subscribers to the report, and if so, notify the user that there are other users who subscribe to the report, allow the user to select alternate reports to suggest to the subscribers and write a message to the subscribers. The user must then choose when the report will be taken offline, and the system will send a notification that the report will be removed. At the designated time, the report will be removed from the list of reports the user manages, from the list of the organization's reports, and from all subscribers' report lists. If the report is available in the marketplace it will be removed from there as well. As mentioned above, in one embodiment, the report will not be removed from users who have paid for it.

In one arrangement, when the user chooses to create a new report, they must enter a name and description, select a report owner from the list of users in the organization or allow an agency to manage the report, and choose which geographic region the report is applicable for. The system shows the user all the data sets that are available to the user's organization. The user selects/adds the data they want, and may select data sets that are recommended for overlaying. The user may also select a visualization to show the selected data, if a visualization is available. The user then modifies the settings and report parameters, and may preview the report (using sample data if necessary). If the user has an account that permits them to sell reports, the system will query whether the report should be placed for sale in the marketplace, and if so, cost and payment parameters (one-time fee, subscription fee, free, shareware, etc). The user must also define the level of customer support to be provided and choose users that can maintain the report. The user may also want to allow access to the report while it is in development, for feedback and testing, or may want to allow stakeholders access.

For ease of exposition, not every step or element of the present invention is described herein as part of software or computer system, but those skilled in the art will recognize that each step or element may have a corresponding computer system or software component. Such computer system and/or software components are therefore enabled by describing their corresponding steps or elements (that is, their functionality), and are within the scope of the present invention. In addition, various elements of the present invention may be stored in a non-transitory storage medium, and selectively executed by a processor. The transfer of data, analyses, and/or reports may be performed by both users and systems.

While the invention has been particularly shown and described with reference to a preferred embodiment, it will be understood by those skilled in the art that various changes in form and detail may be made therein without departing from the spirit and scope of the invention.

What is claimed is:

1. A computer based data management system, comprising:
    a first communication link to support transfer of analytic data into said data management system;
    a second communication link to support data transfer between said data management system and a first user;
    a third communication link to support data transfer between said data management system and a second user;
    a processor with program-controlled operation for processing a first data set received from said first communication link and a second data set, wherein said first data set is a different format than said second data set, and wherein said processing comprises converting said first and second data sets to a unified system format;
    said processor further operable to:
        generate a report utilizing said processed first and second data sets based on instructions received through said second communication link;
        modify said report based on instructions received through said third communication link; and
        calculate said second user's numeric indicia of topical knowledge relative to said first user, wherein said second user's numeric indicia of topical knowledge represents said second user's level of knowledge on a particular topic as compared to said first user's level of knowledge on the same topic.

2. The computer based data management system of claim 1, wherein said processor is further operable to generate an analysis based on said report.

3. The computer based data management system of claim 1, wherein a third user having access to said report is able to comment on said report.

4. The computer based data management system of claim 3, wherein said comment is associated with one or more data points, and said association is represented visually.

5. The computer based data management system of claim 3, said processor further configured to display the data viewed by said third user when commenting on said report, in response to a fourth user selecting said third user's comment.

6. The computer based data management system of claim 1, said processor is further configured to record the access history of the report.

7. The computer based data management system of claim 6, wherein access history includes user name, data being viewed, and duration of access.

8. The computer based data management system of claim 1, wherein said numeric indicia of topical knowledge calculation is based on said first user's profile and said second user's profile.

9. The computer based data management system of claim 1, wherein said first data set provided through said first communication link is updated in real-time or near real-time.

10. The computer based data management system of claim 9, wherein said report is updated in real-time or near real-time.

11. The computer based data management system of claim 1, wherein said data used in said report is processed with a tool, said tool relating to one of: analysis, data collection, and visualization.

12. The computer based data management system of claim 11, wherein said tool is developed by a third party using a development kit.

13. The computer based data management system of claim 11, wherein said tools are available for purchase in an online marketplace.

14. The computer based data management system of claim 1, wherein said reports are available for purchase in an online marketplace.

15. A computer-implemented method, comprising:
- receiving, from a first communication link, analytic data;
- receiving, from a second communication link, data from a first user;
- processing, via a program-controlled processor, said analytic data and said data from the first user, wherein said analytic data is a different format or from a different source than said data from the first user, and wherein said processing comprises converting said analytic data and said data from the first user to a unified system format;
- generating a report based on instructions received through said second communication link, said report utilizing said converted analytic data and said converted data from the first user;
- modifying said report based on instructions received from a second user; and
- calculating said second user's numeric indicia of topical knowledge relative to said first user, wherein said second user's numeric indicia of topical knowledge represents said second user's level of knowledge on a particular topic as compared to said first user's level of knowledge on the same topic.

16. A non-transitory computer-readable storage medium comprising instructions that, when executed by a computer, cause said computer to:
- receive, from a first communication link, analytic data;
- receive, from a second communication link, data from a first user;
- process, via a program-controlled processor, said analytic data and said data from the first user, wherein said analytic data is a different format or from a different source than said data from the first user, and wherein said processing comprises converting said analytic data and said data from the first user to a unified system format;
- generate a report based on instructions received through said second communication link, said report utilizing said converted analytic data and said converted data from the first user;
- modify said report based on instructions received from a second user; and
- calculate said second user's numeric indicia of topical knowledge relative to said first user, wherein said second user's numeric indicia of topical knowledge represents said second user's level of knowledge on a particular topic as compared to said first user's level of knowledge on the same topic.

* * * * *